(12) United States Patent
Atungsiri

(10) Patent No.: US 11,646,839 B2
(45) Date of Patent: May 9, 2023

(54) TRANSMITTER AND RECEIVER AND METHODS OF TRANSMITTING AND RECEIVING

(71) Applicant: Saturn Licensing LLC, New York, NY (US)

(72) Inventor: Samuel Asangbeng Atungsiri, Hampshire (GB)

(73) Assignee: Saturn Licensing LLC, New York, NY (US)

( * ) Notice: Subject to any disclaimer, the term of this patent is extended or adjusted under 35 U.S.C. 154(b) by 41 days.

(21) Appl. No.: 17/334,362

(22) Filed: May 28, 2021

(65) Prior Publication Data
US 2021/0288770 A1 Sep. 16, 2021

Related U.S. Application Data

(63) Continuation of application No. 16/352,436, filed on Mar. 13, 2019, now Pat. No. 11,025,381, which is a
(Continued)

(30) Foreign Application Priority Data

Jun. 22, 2015 (GB) ..................................... 1510979

(51) Int. Cl.
*H04L 5/00* (2006.01)
*H04L 27/26* (2006.01)
*H04J 11/00* (2006.01)

(52) U.S. Cl.
CPC ............ *H04L 5/0044* (2013.01); *H04J 11/00* (2013.01); *H04L 5/0007* (2013.01);
(Continued)

(58) Field of Classification Search
CPC .............................. H04L 5/0007; H04L 27/38
(Continued)

(56) References Cited

U.S. PATENT DOCUMENTS 6,618,452 B1   9/2003 Huber et al.
2003/0067906 A1   4/2003 Young
(Continued)

FOREIGN PATENT DOCUMENTS

CN   101485138 A   7/2009
CN   102484694 A   5/2012
(Continued)

OTHER PUBLICATIONS

Digital Video Broadcasting, "DVB Frame Structure Channel coding and modulation for a second generation digital terrestrial television broadcasting system," ETSI EN 302 755, V1.3.1, Apr. 2012.
(Continued)

*Primary Examiner* — Sam K Ahn
*Assistant Examiner* — Gina M McKie
(74) *Attorney, Agent, or Firm* — Oblon, McClelland, Maier & Neustadt, L.L.P.

(57) ABSTRACT

A receiver for detecting and recovering payload data from a received signal comprises a radio frequency demodulation circuit, a detector circuit and a demodulator circuit. The radio frequency demodulation circuit detects the received signal. The received signal carries the payload data as OFDM symbols in one or more of a plurality of time divided frames, each frame including a bootstrap signal, a preamble signal and a plurality of sub-frames. The demodulator circuit detects bootstrap OFDM symbols to identify communications parameters for detecting the fixed length signalling data, detects the fixed length signalling data to identify the communications parameters for detecting the variable length signalling data, detects the variable length signalling data, and uses the fixed and variable length signalling data to detect the payload data.

14 Claims, 5 Drawing Sheets

Framing structure for ATSC 3.

Related U.S. Application Data continuation of application No. 15/851,162, filed on Dec. 21, 2017, now Pat. No. 10,469,220, which is a continuation of application No. PCT/GB2016/051705, filed on Jun. 9, 2016.

(52) U.S. Cl.
CPC .......... *H04L 5/0053* (2013.01); *H04L 5/0091* (2013.01); *H04L 27/265* (2013.01); *H04L 27/2613* (2013.01); *H04J 2011/0013* (2013.01)

(58) Field of Classification Search
USPC ........................................................ 375/340
See application file for complete search history.

(56) References Cited

U.S. PATENT DOCUMENTS

| | | |
|---|---|---|
| 2008/0165892 A1 | 7/2008 | Yang |
| 2009/0296838 A1 | 12/2009 | Atungsiri et al. |
| 2010/0034219 A1 | 2/2010 | Stadelmeier |
| 2012/0063407 A1 | 3/2012 | Park et al. |
| 2012/0216230 A1 | 8/2012 | Väre et al. |
| 2012/0314786 A1 | 12/2012 | Atungsiri |
| 2012/0324523 A1 | 12/2012 | Stadelmeier et al. |
| 2014/0112289 A1 | 4/2014 | Kim et al. |
| 2014/0269981 A1 | 9/2014 | Asjadi |
| 2014/0294124 A1 | 10/2014 | Atsungsiri et al. |
| 2015/0049741 A1 | 2/2015 | Chen et al. |
| 2015/0058908 A1 | 2/2015 | Ko |
| 2015/0341052 A1 | 11/2015 | Jeong |
| 2015/0341053 A1 | 11/2015 | Kim |
| 2016/0006593 A1 | 1/2016 | Asjadi |
| 2016/0050095 A1 | 2/2016 | Atsungsiri et al. |
| 2016/0050097 A1 | 2/2016 | Atsungsiri |
| 2016/0065337 A1 | 3/2016 | Atsungsiri |
| 2016/0094895 A1 | 3/2016 | Stadelmeier et al. |
| 2016/0241365 A1 | 8/2016 | Bae |
| 2016/0365997 A1* | 12/2016 | Park .................... H04L 27/2626 |
| 2017/0019440 A1* | 1/2017 | Baek .................... H04B 7/0413 |
| 2017/0214964 A1 | 7/2017 | Kim |

FOREIGN PATENT DOCUMENTS

| | | |
|---|---|---|
| EP | 2 226 983 A1 | 9/2010 |
| EP | 2 259 525 A2 | 12/2010 |
| GB | 2515801 A | 1/2015 |
| WO | 2008/002436 A3 | 1/2008 |
| WO | 2015/178693 A1 | 11/2015 |
| WO | 2015/178694 A1 | 11/2015 |
| WO | 2015/178695 A1 | 11/2015 |

OTHER PUBLICATIONS

Advanced Television Systems Committee, "ATSC Candidate Standard: System Discovery and Signaling," May 6, 2015.
AMMAR, "S32-3: AHG on Waveform Generation and Framing," ATSC Bootcamp presentation, May 2015.
Digital Video Broadcasting, "DVB Implementation guidelines for a second generation digital terrestrial television broadcasting system," ETSI TS 102 831, V1.2.1, Aug. 2012.
Digital Video Broadcasting, "DVB Frame Structure Channel coding and modulation for a second generation digital transmission system for cable systems," ETSI EN 302 769, V1.2.1, Apr. 2011.
Digital Video Broadcasting, "DVB Implementation Guidelines for a second generation digital cable transmission system," ETSI TS 102 991, V1.2.1, Jun. 2011.
Digital Video Broadcasting, "DVB Next Generation broadcasting system to Handheld, physical layer specification (DVB-NGH)," DVB Document A160, Nov. 2012.
Samsung/Sony, "ATSC 3.0 Physical Layer Proposal," Jan. 15, 2014.
ATSC3.0 "Preamble using different parts of sigseq for guard and postix", Jan. 2016.

* cited by examiner

Framing structure for ATSC 3.

Loading L1 signalling cells in preamble OFDM symbols.

TRANSMITTER AND RECEIVER AND METHODS OF TRANSMITTING AND RECEIVING

CROSS REFERENCE TO RELATED APPLICATIONS

The present application is a Continuation of U.S. patent application Ser. No. 16/352,436 filed on Mar. 13, 2019, which is a Continuation of U.S. patent application Ser. No. 15/851,162 filed on 21 Dec. 2017, which is a Continuation of PCT application PCT/GB2016/051705 filed on 9 Jun. 2016 which claims priority to United Kingdom Application 1510979.6 filed on 22 Jun. 2015, the contents of each of which are incorporated by reference in their entirety.

FIELD OF THE DISCLOSURE

The present disclosure relates to transmitters, receivers and methods of transmitting and receiving payload data using Orthogonal Frequency Division Multiplexed (OFDM) symbols.

BACKGROUND OF THE DISCLOSURE

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K narrow band sub-carriers (where K is an integer) which are modulated in parallel, each sub-carrier communicating a modulated data symbol such as for example Quadrature Amplitude Modulated (QAM) symbol or Quaternary Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

It has been proposed for a television system known as the Advanced Television Systems Committee (ATSC) 3.0 in a publication entitled ATSC 3.0 Working Draft System Discovery and Signaling [1] to include a pre-amble in a transmitted television signal which is carrying broadcast digital television programs. The preamble includes a so called "boots strap" signal which is intended to provide a receiver with a part of the transmitted signal which it can have a greater likelihood of detecting and therefore can serve as a signal for initial detection. This is because broadcasters anticipate providing multiple services, within a broadcast signal in addition to just broadcast television. Such services may be time-multiplexed together within a single RF channel. There is therefore a need to provide an easily detectable signal segment (the bootstrap signal) that is transmitted as part of a pre-amble to multiplexed frames, so that a receiver can discover and identify what signals and services are available.

It has been proposed [1] to make the bootstrap signal have a fixed configuration, including sampling rate, signal bandwidth, subcarrier spacing, time-domain structure etc. known to all receiver devices and to carry information to enable processing and decoding the wireless service associated with a detected bootstrap. This new capability ensures that broadcast spectrum can be adapted to carry new services and/or waveforms that are preceded by a universal entry point provided by the bootstrap for public interest to continue to be served in the future.

The bootstrap has been designed to be a very robust signal and detectable even at very low signal to noise ratio levels. As a result of this robust encoding, individual signalling bits within the bootstrap are comparatively expensive in terms of the physical resources that they occupy for transmission. Hence, the bootstrap is generally intended to signal only the minimum amount of information required for system discovery and for initial decoding of the following signal. However in order to detect payload data transmitted as OFDM symbols it is necessary to communicate layer 1 (L1) signalling data indicating communications parameters which have been used to carry the payload data as OFDM symbols.

SUMMARY OF THE DISCLOSURE

Various further aspects and embodiments of the disclosure are provided in the appended claims, including a transmitter, a receiver for detecting payload data from a received signal and methods of transmitting and receiving. According to the present technique there is provided a transmitter for transmitting payload data using Orthogonal Frequency Division Multiplexed (OFDM) symbols comprising a frame builder, a modulator and a transmission circuit. The frame builder is configured to receive the payload data to be transmitted and to receive Layer 1 (L1) signalling data for use in detecting and recovering the payload data at a receiver, and to form the payload data with the signalling data into a plurality of time divided frames for transmission, each of the time divided frames including a bootstrap signal, a preamble signal and a plurality of sub-frames. The modulator is configured to modulate one or more OFDM symbols of the preamble with the signalling data and to modulate a plurality of OFDM symbols with the payload data for transmission in each of the sub-frames. The transmission circuit transmits the OFDM symbols carrying the signalling data of the preamble and the payload data in the plurality of sub-frames. The preamble signal forms a start of each frame and comprises one or more OFDM symbols carrying the L1 signalling data, a first of the one or more OFDM symbols carrying a fixed length part of the L1 signalling data of a predetermined size, the fixed length L1 signalling data indicating communications parameters for detecting a variable length part of the L1 signalling data carried in the remaining one or more OFDM symbols of the preamble signal, and the bootstrap signal comprises one or more OFDM symbols carrying an indication of communications parameters for detecting the fixed length L1 signalling data carried by the first of the one or more OFDM symbols of the preamble signal. Embodiments of the present technique provide an improvement in detecting and recovering payload data from a transmitted signal representing the payload data as OFDM symbols by forming a progressively more robust communication of signals comprising a preamble for carrying the signalling data of a variable length, signalling data of a fixed length and a bootstrap signal, which carries an indication of the fixed length signalling data of the preamble. The bootstrap signal can be arranged to be most robustly communicated, followed by the fixed length L1 signalling data of the first OFDM symbol of the preamble and then the variable length L1 signalling data. As such a receiver is most likely to detect the bootstrap signal, then the first OFDM symbol of the preamble followed by the remaining OFDM symbols of the preamble signal.

Various further aspects and features of the present disclosure are defined in the appended claims, which include a method of transmitting payload data, a receiver and a method of detecting and recovering payload data.

BRIEF DESCRIPTION OF THE DRAWINGS

Embodiments of the present disclosure will now be described by way of example only with reference to the accompanying drawings in which like parts are provided with corresponding reference numerals and in which FIG. 1 provides a schematic diagram illustrating an arrangement of a broadcast transmission network.

DETAILED DESCRIPTION OF EXAMPLE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 1:
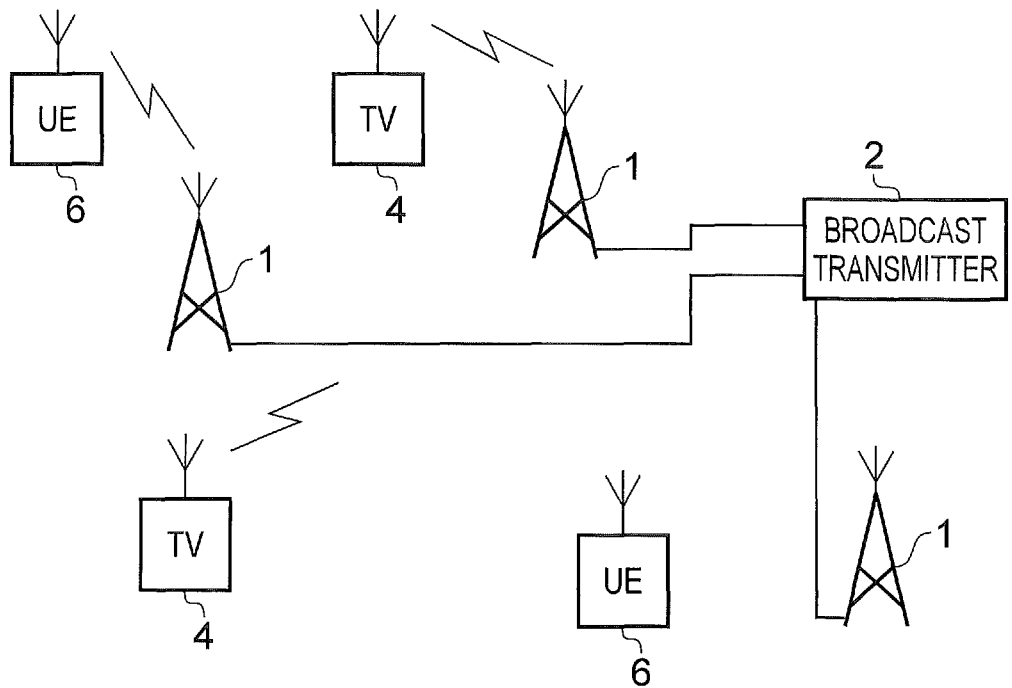

An example illustration of a television broadcast system is shown in FIG. 1. In FIG. 1 broadcast television base stations 1 are shown to be connected to a broadcast transmitter 2. The broadcast transmitter 2 transmits signals from base stations 1 within a coverage area provided by the broadcast network. The television broadcast network shown in FIG. 1 may operate as a so called multi-frequency network where each television broadcast base stations 1 transmits its signal on a different frequency than other neighbouring television broadcast base stations 1. The television broadcast network shown in FIG. 1 may also operate as a so called single frequency network in which each of the television broadcast base stations 1 transmit the radio signals conveying audio/video data contemporaneously so that these can be received by television receivers 4 as well as mobile devices 6 within a coverage area provided by the broadcast network. For the example shown in FIG. 1 the signals transmitted by the broadcast base stations 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast base stations 1 is such that the propagation time between the signals transmitted by different broadcast base stations 1 is less than or does not substantially exceed a guard interval that precedes the transmission of each of the OFDM symbols then a receiver device 4, 6 can receive the OFDM symbols and recover data from the OFDM symbols in a way which combines the signals transmitted from the different broadcast base stations 1. Examples of standards for broadcast networks that employ OFDM in this way include DVB-T, DVB-T2 and ISDB-T.

Figure 2:
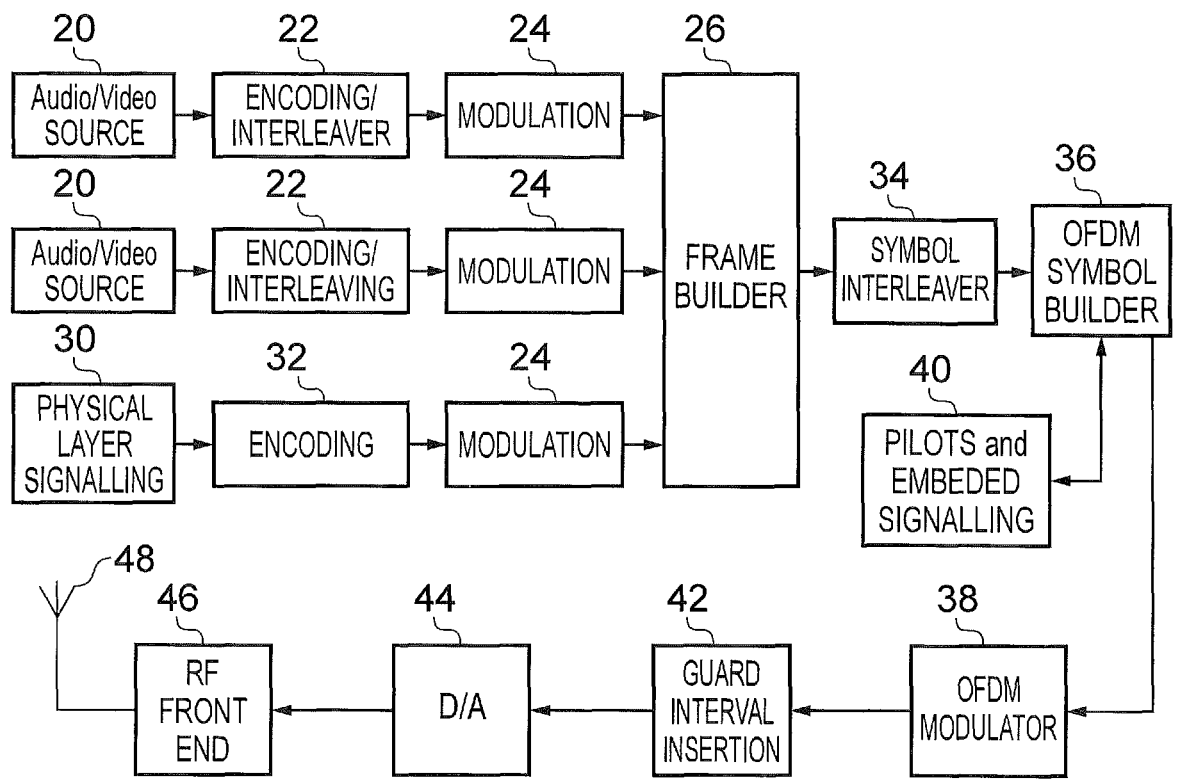
FIG. 2 provides a schematic block diagram illustrating an example transmission chain for transmitting broadcast data via the transmission network of FIG. 1.

An example block diagram of a transmitter forming part of the television broadcast base stations 1 for transmitting data from audio/video sources is shown in FIG. 2. In FIG. 2 audio/video sources 20 generate the audio/video data representing television programmes. The audio/video data is encoded using forward error correction encoding by an encoding/interleaver block 22 which generates forward error correction encoded data which is then fed to a modulation unit 24 which maps the encoded data onto modulation symbols which are used to modulate OFDM symbols. Depicted on a separate lower arm, signalling data providing physical layer signalling for indicating for example the format of coding and modulation of the audio/video data is generated by a physical layer signalling unit 30 and after being encoded by an encoding unit 32, the physical layer signalling data is then modulated by a modulation unit 24 as with the audio/video data.

A frame builder 26 is arranged to form the data to be transmitted with the physical layer signalling data into a frame for transmission. The frame includes a time divided section having a preamble in which the physical layer signalling is transmitted and one or more data transmission sections which transmit the audio/video data generated by the audio/video sources 20. An interleaver 34 may interleave the data which is formed into symbols for transmission before being modulated by an OFDM symbol builder 36 and an OFDM modulator 38. The OFDM symbol builder 36 receives pilot signals which are generated by a pilot and embedded data generator 40 and fed to the OFDM symbol builder 36 for transmission. An output of the OFDM modulator 38 is passed to a guard insertion unit 42 which inserts a guard interval and the resulting signal is fed to a digital to analogue convertor 44 and then to an RF front end 46 before being transmitted by an antenna 48.

Figure 3:
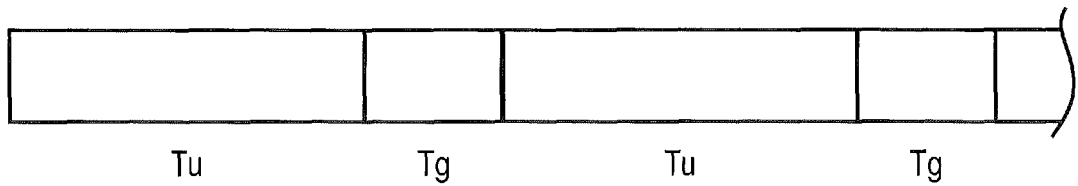
FIG. 3 provides a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform which may comprise part of the OFDM modulator 38. Thus the data to be transmitted is formed in the frequency domain and transmitted in the time domain. As shown in FIG. 3 each time domain symbol is generated with a useful part of duration Tu seconds and a guard interval of duration Tg seconds. The guard interval is generated by copying a part of the useful part of the symbol with duration Tg in the time domain, where the copied part may be from an end portion of the symbol. By correlating the useful part of the time domain symbol with the guard interval, a receiver can be arranged to detect the start of the useful part of the OFDM symbol which can be used to trigger a Fast Fourier Transform to convert the time domain symbol samples into the frequency domain from which the transmitted data can then be recovered. Such a receiver is shown in FIG. 4.

Figure 4:
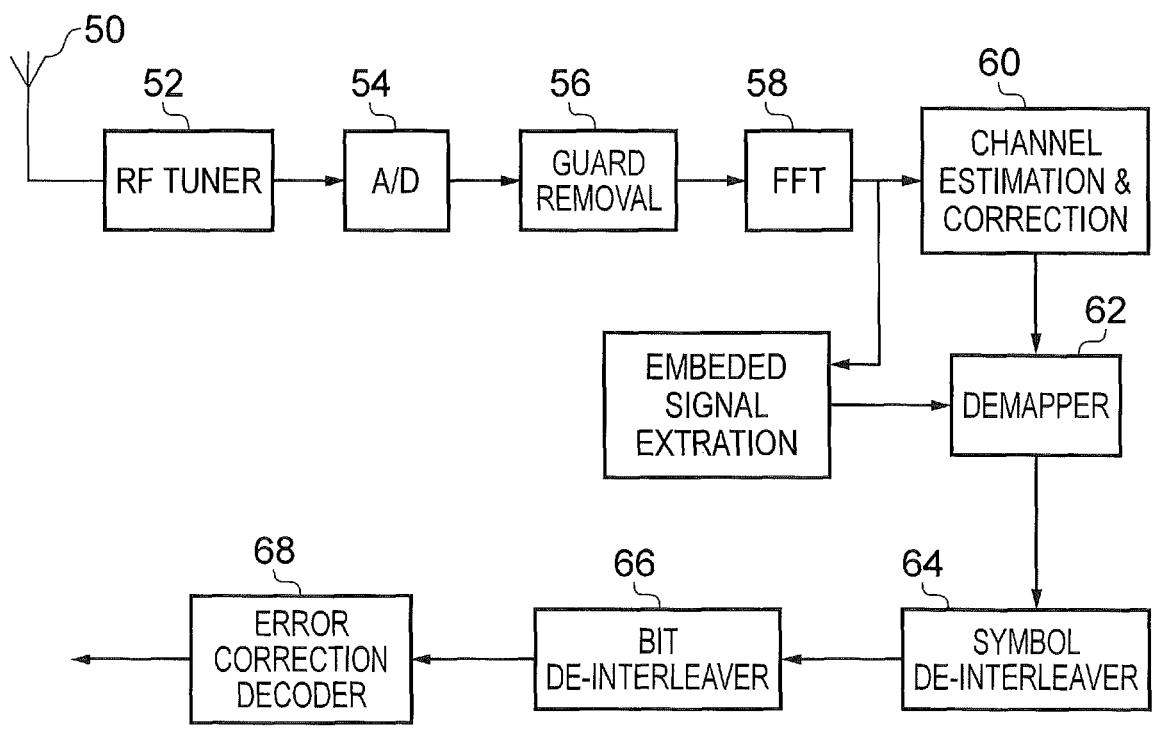
FIG. 4 provides a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 estimates the transmission channel used for equalisation for example by using pilot sub-carriers which have been embedded into the OFDM symbols. After excluding the pilot sub-carriers, all the data-bearing sub-carriers are fed to a de-interleaver 64 which de-interleaves the sub-carrier symbols. A de-mapper unit 62 then extracts the data bits from the sub-carriers of the OFDM symbol. The data bits are fed to a bit de-interleaver 66, which performs the de-interleaving so that the error correction decoder can correct errors in accordance with a conventional operation.

Framing Structure with Preamble

Figure 5:
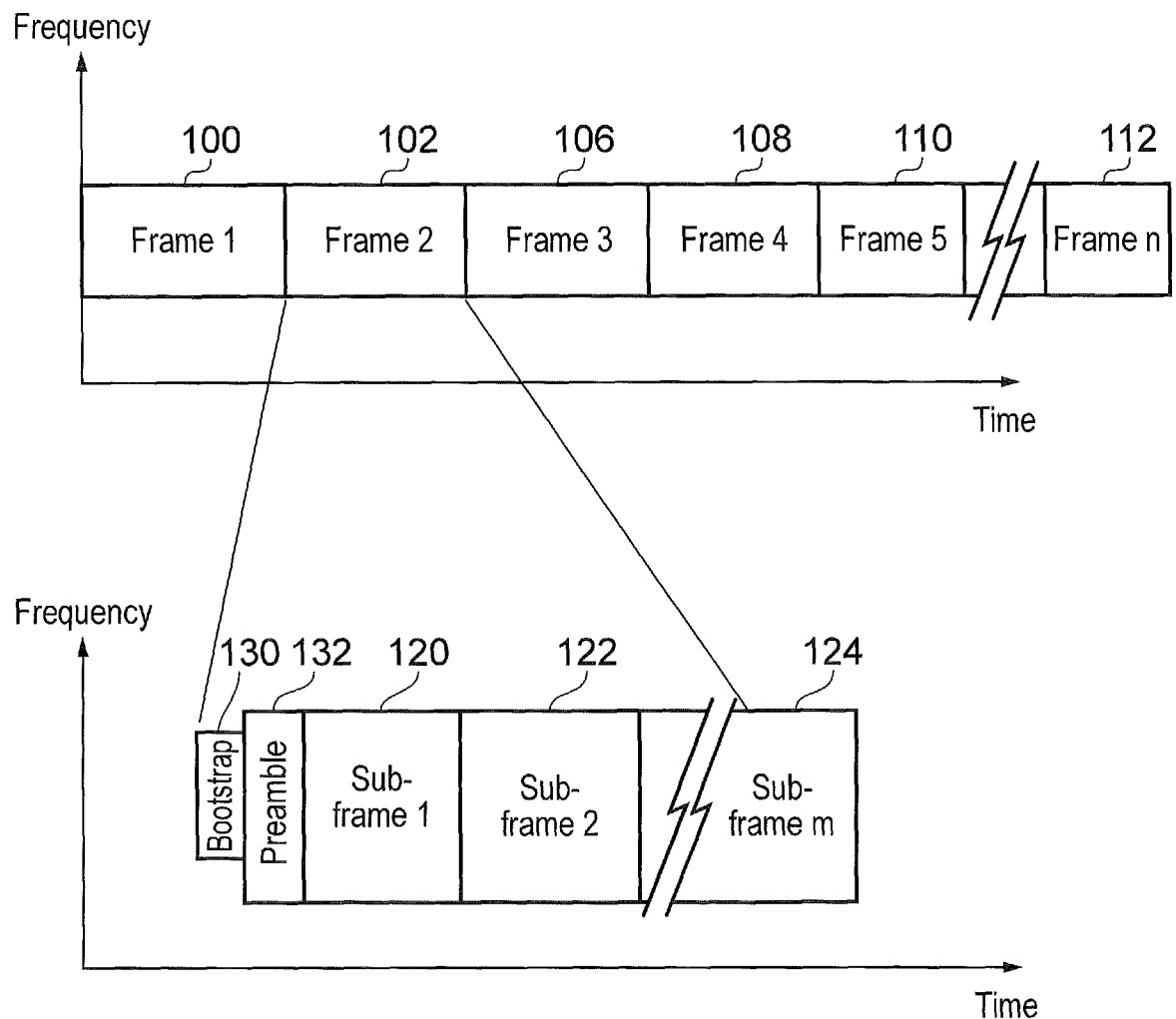
FIG. 5 provides a schematic block diagram illustrating a framing structure of a television transmission system such as ATSC3.0 including a sub frame structure.

FIG. 5 shows a schematic diagram of the framing structure for carrying payload data in one or more physical layer pipes that may be transmitted and received in the systems described with reference to FIGS. 1 to 4. FIG. 5 illustrates in a first part that a frequency band allocated for the transmission of the payload data is divided into a plurality of time frames 100, 102, 106, 108, 110, 112. Each of the frames is then divided into a plurality of sub-frames 120, 122, 124. Also as shown in FIG. 5, each frame begins with a bootstrap signal 130 followed by a preamble signal 132. As will be explained below, the bootstrap signal may comprise one or more OFDM symbols, and the preamble may also comprise one or more OFDM symbols. Each frame includes a plurality of different physical layer sub-frames, 120, 122, 124 some for example, targeted for mobile reception whilst others are targeted for fixed roof-top antenna reception.

The framing structure shown in FIG. 5 is therefore characterised by sub-frames which may each include payload data modulated and encoded using different parameters. This may include for example using different OFDM symbol types having different number of sub-carriers per symbol, which may be modulated using different modulation schemes, because different sub-frames may be provided for different types of receivers. In one example a frame proposed for an ATSC system which can have duration as long as 5 seconds. The frame may be comprised of:

1. A bootstrap composed of many short OFDM symbols carrying the basic system access signalling in a very robust way. One of the parameters signalled in the bootstrap is the waveform structure of the preamble.
2. A preamble which is comprised of one or more OFDM symbols and carries the physical layer (Layer 1) signalling that comprises frame structure parameters and payload access parameters for all the sub-frames of the frame.
3. The frame is comprised of one or a signalled number of sub-frames which carry the payload that comprises the services partitioned into PLPs. Each sub-frame is comprised of a signalled number of OFDM symbols of a particular FFT size. However, FFT sizes can differ between sub-frames.

Bootstrap Signal

As explained in [1], the bootstrap signal provides a universal entry point into an ATSC way form. The bootstrap signal is supposed to have a fixed configuration in that the sampling rate, the signal bandwidth, the sub carrier spacing and time domain structure are fixed within the signal and therefore will be known a priori at the receivers. The bootstrap signal may comprise for example four or more OFDM symbols beginning with a synchronisation symbol positioned at the start of each frame to enable service discovery, coarse time synchronisation, frequency offset estimation and initial channel estimation at the receiver. The remaining other bootstrap OFDM symbols contain sufficient control signalling to provide communications parameters to allow the received signal to be decoded for the remaining part of the frame. Thus the bootstrap signal carries signalling information to enable a receiver to discover the parameters with which the L1 signalling data have been communicated in the preamble signal, which can then be used to detect the communications parameters with which the data-bearing frames have been configured so that a receiver can detect and recover the payload data. More details of an example form of a bootstrap signal can be found in [1] the content of which are incorporated herein by reference.

Preamble Structure

As the preamble occurs only once in a frame, it follows that in a frame with sub-frames of different FFT sizes, the first sub-frame should use the smallest FFT size that occurs in the frame. This is so that if the lowest FFT sub-frame is for mobile services, then mobile receivers have to be able to decode the preamble under mobile conditions.

The preamble can be comprised of one or more OFDM symbols of the same FFT size as that used for the payload symbols of the first sub-frame of the frame. The number of OFDM symbols in the preamble of a given frame can be calculated from the length of the signalling and its modulation and coding parameters. How this can be done will be described below. The guard interval duration used for all the preamble symbols shall be the same and must be greater or equal to the guard interval of the payload symbols of the first sub-frame. Indeed, all guard interval durations for all preamble, sub-frame start or closing and payload symbols that share a single RF channel are expected to be substantially the same as the duration is chosen by the broadcaster based on how far apart the transmitters are spaced in the network in which that RF channel is broadcast. In order to reduce the susceptibility of the signalling carried in the preamble symbols to deep fades, the QAM cells that result from the modulation of the signalling information it carries are interleaved across all the preamble OFDM symbols.

The number of OFDM symbols $N_P$ to be used for the preamble is decided as follows:

$$N_P = \text{ceil}(N_{L1}/N_D)$$

Where $N_{L1}$ is the number of QAM cells to be used for the L1 signalling and $N_D$ is the number of data carriers per preamble OFDM symbol. Subsequent sections show how to calculate $N_{L1}$. In one embodiment, only the first preamble symbol has the minimum number of useful sub-carriers possible for its FFT size and there is signalling for the useful number of sub-carriers for the other preamble symbols. Yet in another embodiment, all the preamble symbols modulate only the minimum number of useful sub-carriers possible for their FFT size.

If signalling does not fill all the available data capacity of the preamble symbols, payload cells from the first sub-frame can be carried in the remaining cells of the preamble.

Sub-Frame Structure: Overview

Figure 6:
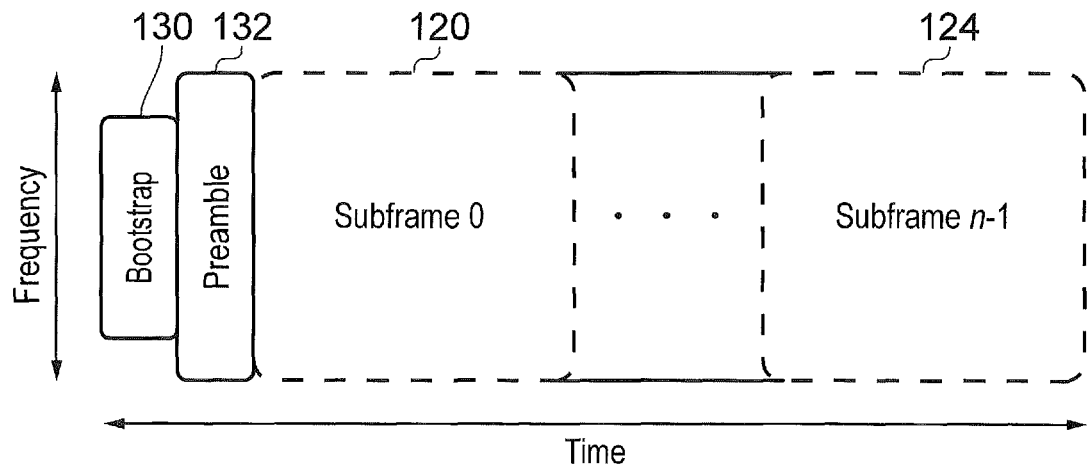
FIG. 6 provides a more detailed representation of one of the frames of the television signal shown in FIG. 5.

As shown in FIG. 6, according to the present technique a transmitter is configured to transmit the payload data in each frame in accordance with a plurality of sub frames. The sub frames may be themselves separated by a start symbol and closing symbol. In one example sub frame starting and sub frame closing symbols are provided which may comprise OFDM symbols with scattered pilot carrier spacing as for a preamble symbol in which all of the scattered pilots phases of a predetermined pattern are included within the same OFDM symbol. Furthermore, each of the starting and closing framing symbols include energy balancing cells which are not loaded or modulated with QAM cells but are set to zero. This is to provide a balancing of the average power because the preamble and sub-frame start and closing symbols have more pilots than payload symbols of the sub frames. Since each of the pilot bearing subcarriers has a boosted power, setting some of the subcarriers of the sub frame starting and closing symbols to zero produces a balancing of the energy transmitted within the OFDM symbol so that these have the same average power as payload symbols of the subframe. Sub frame starting and closing symbols may be included when the FFT size or the pilot pattern changes between a preceding and a following sub frame. The last preamble symbol acts as the subframe start symbol for the first subframe.

As shown from the sub frame structure in FIG. 6, the frame is preceded by a bootstrap signal followed by a preamble signal. According to the present technique the preamble signal forms a start of each frame and comprises one or more OFDM symbols carrying layer one signalling data which is used to detect and to recover the payload data from the sub frame following. A first of the one or more OFDM symbols carrying the fixed length L1 signalling data of a predetermined size indicates communications parameters for detecting the rest of the L1 signalling data carried in the remaining of the one or more OFDM symbols of the preamble. The bootstrap signal 130 comprises one or more OFDM symbols carrying an indication of the communications parameters for detecting the fixed length L1 signalling data carried by the first of the OFDM symbol of the preamble signal.

In one example, a number of the OFDM symbols of the preamble may be variable, the number being indicated by the fixed length L1 signalling data of the first of the one or more OFDM symbols of the preamble or calculated from the length of the L1 signalling data. This length is signalled in the fixed length L1 signalling.

In one example the fixed length L1 signalling data part may be carried in a first part of a first OFDM symbol and a number used subcarriers of the first OFDM symbol may be predetermined whilst the FFT size of the first OFDM symbol of the preamble is indicated by the bootstrap signal. The number of used subcarriers of the OFDM symbols of the preamble other than the first OFDM symbol of the preamble may be variable in one example, the number of subcarriers being indicated in the fixed length L1 signalling data of the first of the OFDM symbol of the preamble.

In accordance with the present technique, each of the sub frames may carry payload data in OFDM symbols having a different number of subcarriers and therefore being generated by a different FFT size. For example, one sub frame may have 8 k subcarriers where another of the subframes may use OFDM symbols with 32 k subcarriers. According to the present technique the OFDM symbols of the preamble may have the same number of subcarriers as the OFDM symbols of the first sub frame. For example if the sub frame with the smallest number of subcarriers is 8 k, and the frame has more than one subframe, then the sub frame with 8 k FFT size shall be arranged to be the first subframe and accordingly, the preamble symbols shall use 8 k FFT which is the same as the FFT size of the first subframe.

Therefore according to the present technique each subframe may start with a sub-frame start symbol (SFSS) and terminate with a sub-frame closing symbol (SFCS). SFSS and SFCS have the same FFT size as all the other payload symbols in the sub-frame concerned but have a denser boundary symbol pilot distribution. Boundary symbol pilots are spaced in frequency by the Dx sub-carriers of the corresponding scattered pilot pattern (SPP) used for the payload symbols of the sub-frame.

The use of SFSS and SFCS is governed by the following rules:

1. Sub-frames using a different FFT size or SPP to the preceding sub-frame would start with a SFSS whose boundary symbol pilots Dx is same as that of the SPP used in the sub-frame.
2. Sub-frames using a different FFT size or SPP than the following sub-frame would terminate with a SFCS whose boundary symbol pilots Dx is the same as that of the SPP used in the sub-frame.
3. The last preamble symbol is used as the SFSS for the first sub-frame of the frame.
4. The last symbol of the last sub-frame of a frame is a SFCS.

Bootstrap Preamble Signalling: Overview

The waveform structure of the preamble is signalled using a preamble structure field of the bootstrap signalling. This field is used to signal the following:

The FFT size of the preamble symbols

The Guard interval of the preamble symbols

The modulation and coding parameters used to carry signalling on the preamble

Once the bootstrap is decoded, these parameters of the preamble are therefore known.

Preamble Signalling Paradigm

The preamble carries the physical layer or L1 signalling. This signalling can be split into two categories:

1.1 Frame Structure Signalling

This category describes the structure of the frame and comprises such parameters as:
  Early Alert Active information
  The number of sub-frames in the frame
  For each sub-frame
    Number of OFDM symbols in sub-frame
    FFT size, GI, Pilots pattern, PAPR, use of MIMO
    Number of useful sub-carriers per OFDM symbol
    Frequency interleaver active flag
  Etc.

This category of signalling has a fixed length.

1.2 Payload Access Signalling

The payload access signalling describes how the payload which is partitioned into PLPs is carried in the sub-frames and also the modulation, coding and interleaving parameters of each PLP. This category of signalling tends to have variable length that depends on the number and types of PLPs.

1.3 how the Preamble Carries Signalling

The signalling is divided into two categories as described above with the first category designated as L1-fixed and the second as L1-variable. L1-fixed has a fixed and known number of bits $B_{L1F}$ and is coded separately using the modulation $M_{L1F}$ (which is the number of bits per QAM symbol) and coding $R_{L1F}$ (which is the rate of the code used) parameters signalled in bootstrap.

The number of OFDM cells occupied by the L1-fixed signalling in the preamble is therefore:

$$N_{L1F}=B_{L1F}*(1+R_{L1F})/M_{L1F}$$

The receiver should be able to work this out as well—then extract and decode the cells to get the information carried in the L1-fixed signalling.

As the number of bits in the L1-variable signalling is variable, this has to be signalled in the L1-fixed. Further, as the number of preamble symbols over which the QAM cells that result from the modulation of the signalling information are interleaved depends on the number of L1-variable cells, L1-fixed cells cannot be interleaved across multiple preamble symbols. Thus L1-fixed cells are all carried in the first preamble symbol which nevertheless frequency interleaved. FIG. 2 illustrates how the cells that result from QAM-mapped bits from the separately coded L1-fixed and L1-variable signalling information are carried in the preamble $N_P$ symbols for a case when $N_P=3$. The arrows show the interleaving of cells between the preamble symbols.

Figure 7:
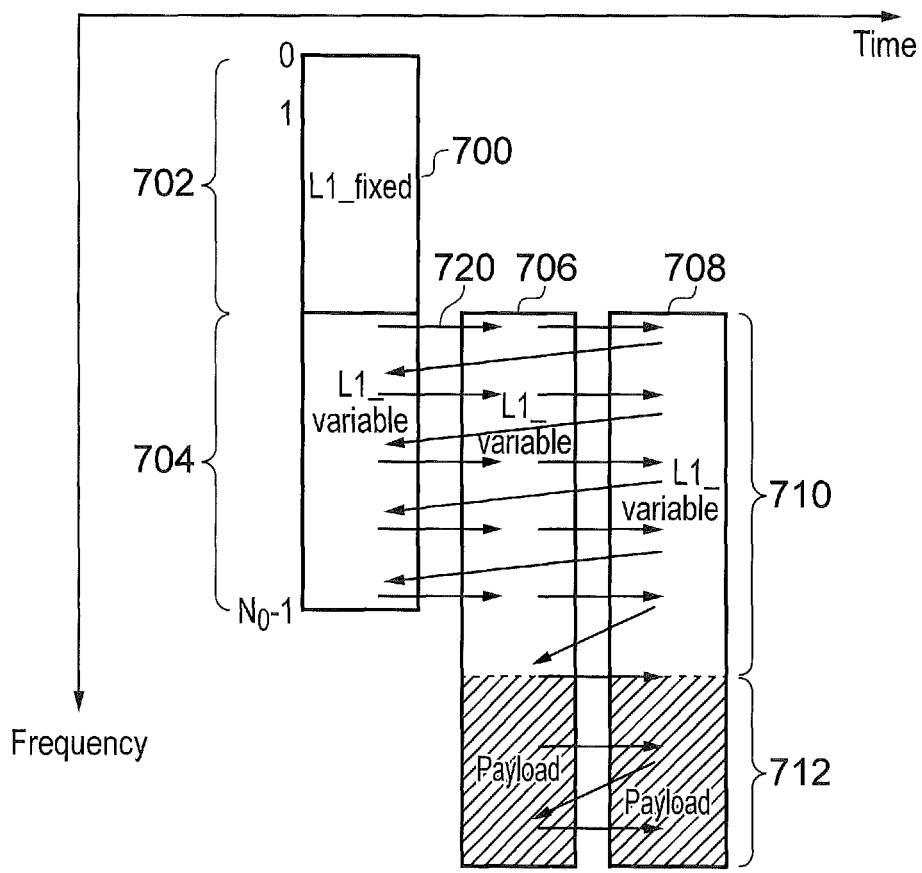
FIG. 7 is a schematic representation of a plurality of OFDM symbols which form part of a preamble symbol which is shown in FIG. 6.

FIG. 7 provides a schematic block diagram of the loading of L1 signalling cells in preamble OFDM symbols. For example, showing in FIG. 7 there are three OFDM symbols which are used to carry the L1 signalling data. As shown in FIG. 7, a first of the OFDM symbols 700 includes a first section 702 which is reserved and is therefore of a fixed length for carrying a first fixed length L1 signalling data. A remaining part 704 of the first OFDM symbol 700 is allocated to carry layer 1 (L1) signalling data which is provided for carrying a varying amount of L1 signalling. The varying L1 signalling capacity occupies the remaining two other OFDM symbols 706, 708. Each part of the remaining two OFDM symbols 706, 708 carries varying capacity L1 signalling data in a section 710. Any remaining capacity is allocated for the transmission of payload data in a section 712. As shown by arrows 720, the data cells of the L1 signalling data of the varying capacity 704, 710 are for each of the OFDM symbols 700, 706, 708 interleaved in time. However all of the cells of the OFDM symbols of the preamble are frequency interleaved by the frequency interleaver 34 shown in FIG. 2.

Figure 8A:
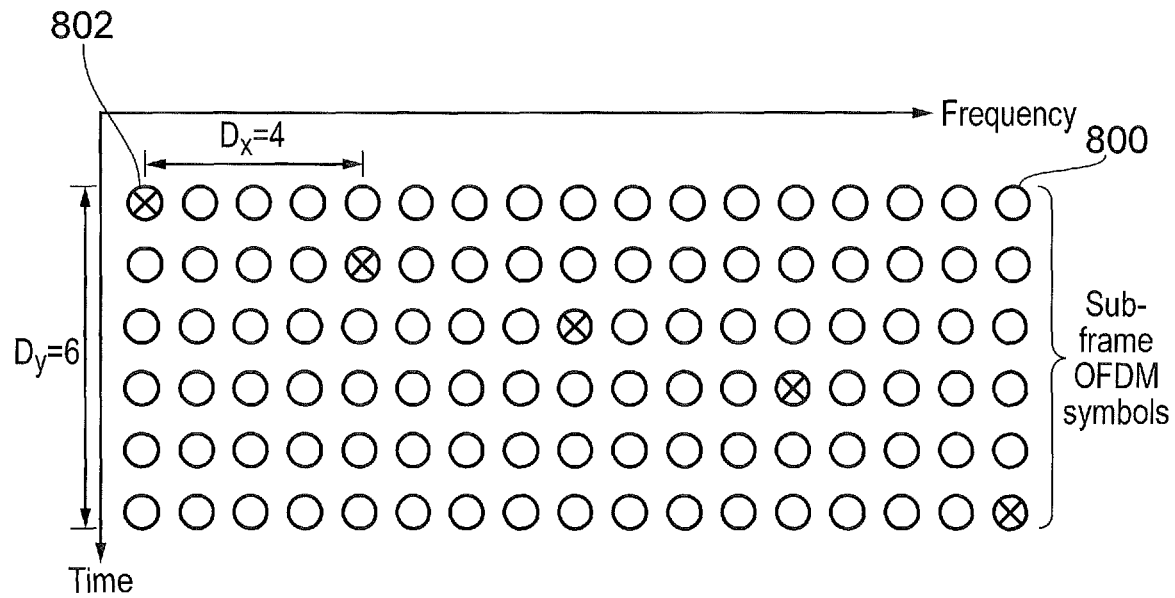
FIG. 8a is a schematic representation of a plurality of OFDM symbols illustrating scattered pilot subcarriers and FIG. 8b is a schematic representation of an OFDM symbol of a preamble carrying all of the scattered pilot subcarriers in the same OFDM symbol.
Figure 8B:
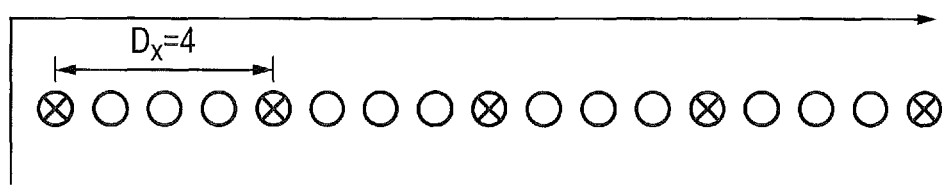

In one example embodiment the modulator may be configured with the frame builder to generate for each sub frame one or more OFDM symbols carrying the payload data and each of the one or more OFDM symbols of the sub frame includes pilot subcarriers according to a scattered and continuous predetermined pattern. The scattered pilot subcarriers are transmitted in each OFDM symbol of the sub frame with the affect that the location of each of the scattered pilot subcarriers changes from one symbol to the next. Furthermore, the location of the pilot subcarriers changes by a factor Dx from one OFDM symbol to another. Further, according to the present technique the one or more OFDM symbols of the preamble symbol each include in the pilot subcarrier symbols all of the scattered and continuous subcarrier locations which are otherwise present in a plurality of OFDM symbols of the sub frame. Such an arrangement is illustrated in FIGS. 8a and 8b. As shown in FIG. 8a, six OFDM symbols 800 are shown comprising in this example 17 subcarriers. As shown by the subcarriers marked with a cross 802 selected subcarriers 802 are arranged to carry pilot symbols. A location of the pilot symbols is scattered in the sense that from one symbol to the next, the location is based by a factor Dx and over a cycle of 6 OFDM symbols 800 a displacement of the subcarrier location of the pilot symbol is moved until the cycle repeats for the next set of 6 OFDM symbols. Accordingly, a displacement between the same subcarrier location carrying the pilot symbols is Dy=6 OFDM symbols. In contrast as shown in FIG. 8b, the scattered pilot symbols are shown for all of the possible locations where a subcarrier carries a pilot symbol for the OFDM symbols shown in FIG. 8a.

Various further aspects and features of the present technique are defined in the appended claims and various combinations of the features of the dependent claims may be made with those of the independent claims other than the specific combinations recited for the claim dependency. Modifications may also be made to the embodiments hereinbefore described without departing from the scope of the present technique. For instance, processing elements of embodiments may be implemented in hardware, software, and logical or analogue circuitry. Furthermore, although a feature may appear to be described in connection with particular embodiments, one skilled in the art would recognise that various features of the described embodiments may be combined in accordance with the present technique.

[1] ATSC Candidate Standard: System Discovery and Signalling (Doc. A/321 Part 1), Document 532-231r4, 6 May 2015

[2] EN 302755 V1.3.1, Frame structure channel coding and modulation for a second generation digital terrestrial television broadcasting system (DVB-T2), April 2012

FURTHER EMBODIMENTS OF THE DISCLOSURE

First further embodiments of the disclosure are defined by the following numbered clauses:

1. A transmitter for transmitting payload data using Orthogonal Frequency Division Multiplexed (OFDM) symbols, the transmitter comprising
  a frame builder configured to receive the payload data to be transmitted and to receive Layer 1, L1, signalling data for use in detecting and recovering the payload data at a receiver, and to form the payload data with the signalling data into a plurality of time divided frames for transmission, each of the time divided frames including a bootstrap signal, a preamble signal and a plurality of sub-frames, a modulator configured to modulate one or more OFDM symbols of the preamble with the signalling data and to modulate a plurality of OFDM symbols with the payload data for transmission in each of the sub-frames, and a transmission circuit for transmitting the OFDM symbols carrying the signalling data of the preamble and the payload data in the plurality of sub-frames, wherein the preamble signal forms a start of each frame and comprises one or more OFDM symbols carrying the L1 signalling data, a first of the one or more OFDM symbols carrying a fixed length part of the L1 signalling data of a predetermined size, the fixed length L1 signalling data indicating communications parameters for detecting a variable length part of the remaining L1 signalling data carried in the remaining one or more OFDM symbols of the preamble, and the bootstrap signal comprises one or more OFDM symbols carrying an indication of communications parameters for detecting the fixed length L1 signalling data carried by the first of the one or more OFDM symbols of the preamble signal.

2. A transmitter as defined in Clause 1, wherein a number of the OFDM symbols of the preamble is variable, the number being indicated by the fixed length L1 signalling data of the first of the one or more OFDM symbols of the preamble or calculable from the length of the L1 signalling as signalled in the fixed length L1 signalling.

3. A transmitter as defined in Clause 1 or 2, wherein the fixed length L1 signalling data is carried in a first part of the first OFDM symbol and the FFT size of the first OFDM symbol is indicated by the bootstrap signal.

4. A transmitter as defined in Clause 3 or 4, wherein a number of sub-carriers of one or more of the OFDM symbols of the preamble other than the first OFDM symbols is variable, the number of sub-carriers being indicated by the fixed length L1 signalling data of the first of the OFDM symbols of the preamble.

5. A transmitter as defined in any of Clauses 1 to 5, wherein the modulator is configured with the frame builder to generate the preamble signal with the one or more OFDM symbols using an FFT size which is the same as the FFT size of the OFDM symbols of a first of the sub-frames of each frame.

6. A transmitter as defined in any of Clauses 1 to 5, wherein the modulator is configured with the frame builder to generate, for each sub-frame, one or more OFDM symbols carrying the payload data, and each of the one or more OFDM symbols of the sub-frame includes scattered and continuous pilot sub-carriers at locations in the OFDM symbols according to a predetermined pattern, the scattered pilot sub-carriers being transmitted in each OFDM symbol at locations displaced with respect to a sub-carrier in a previous OFDM symbol by a predetermined value, and the one or more OFDM symbols of the preamble signal each include pilot sub-carrier symbols at sub-carrier locations corresponding to any sub-carrier location at which a scattered sub-carrier is transmitted in any of the OFDM symbols of a following sub-frame.

7. A transmitter as defined in any of Clauses 1 to 5, wherein the modulator is configured with the frame builder to generate the OFDM symbols of the preamble signal with a Guard Interval, GI, duration, which is the same as or greater than the GI duration of the one or more OFDM symbols of a first of the sub-frames of each frame.

8. A transmitter as defined in any of Clauses 1 to 5, the transmitter comprising an interleaver configured to interleave modulation cells of the remaining L1 signalling data of variable size in time between the one or more OFDM symbols of the preamble signal.

9. A transmitter as defined in Clause 9, the transmitter comprising a frequency interleaver configured to interleave in frequency each of the one or more preamble OFDM symbols received from the frame builder.

10. A transmitter as defined in any of Clauses 1 to 9, wherein the modulator is configured with the frame builder to modulate any of the sub-carriers of the one or more OFDM symbols of the preamble which are not carrying the fixed length L1 signalling data or the remaining variable L1 signalling data with payload data.

11. A transmitter as defined in any of Clauses 1 to 10, wherein the communications parameters carried by the one or more OFDM symbols of the bootstrap signal include at least the FFT size, a guard interval duration, a pilot pattern, coding and modulation parameters for use by a receiver in detecting and demodulating the first OFDM symbol of the preamble and decoding the fixed length part of the L1 signalling data.

12. A transmitter as defined in any of Clauses 1 to 11, wherein one or more of the sub-frames of each frame include a starting OFDM symbol and/or a closing OFDM symbol, the starting and the closing OFDM symbols include energy balancing cells comprising sub-carriers which are not modulated and are set to zero.

13. A transmitter as defined in Clause 12, wherein the frames include the starting and/or the closing OFDM symbols when there is a change in at least one of a pilot sub-carrier patterns or the FFT size of the OFDM symbols carrying the payload data in the sub-frame.

14. A receiver for detecting and recovering payload data from a received signal, the receiver comprising a radio frequency demodulation circuit configured to detect the received signal, the received signal having been formed and transmitted by a transmitter to carry the payload data as Orthogonal Frequency Division Multiplexed (OFDM) symbols in one or more of a plurality of time divided frames, each frame including a bootstrap signal, a preamble signal and a plurality of sub-frames each of which carries the payload data in a plurality of OFDM symbols, the preamble signal forming a start of each frame and comprising one or more OFDM symbols carrying layer 1, L1, signalling data for detecting the payload data carried by the frame, a first of the one or more OFDM symbols carrying a fixed length part of the L1 signalling data of a predetermined size, the fixed length L1 signalling data indicating communications parameters for detecting a variable length part of the L1 signalling data carried in the remaining one or more OFDM symbols of the preamble signal, and the bootstrap signal comprising one or more OFDM symbols carrying an indication of communications parameters for detecting the fixed length L1 signalling data carried by the first of the one or more OFDM symbols of the preamble signal, a detector circuit configured to detect and to convert a useful part of the one or more of the bootstrap OFDM symbols, the preamble OFDM symbols and the payload OFDM symbols into the frequency domain, a demodulator circuit configured to detect the one or more bootstrap OFDM symbols to identify the communications parameters for detecting the fixed length L1 signalling data from the first of the OFDM symbols of the preamble signal, to detect the fixed length L1 signalling data from the first of the OFDM symbols of the preamble to identify the communications parameters for detecting the variable length L1 signalling data from the remaining one or more OFDM symbols of the preamble signal, to detect the variable length L1 signalling data from the remaining one or more OFDM symbols of the preamble signal, and to use the fixed and variable length L1 signalling data to detect the payload data.

15. A method of transmitting payload data using Orthogonal Frequency Division Multiplexed (OFDM) symbols, the method comprising receiving the payload data to be transmitted, receiving Layer 1, L1, signalling data for use in detecting and recovering the payload data at a receiver, forming the payload data with the signalling data into a plurality of time divided frames for transmission, each of the time divided frames including a bootstrap signal, a preamble signal and a plurality of sub-frames, modulating one or more OFDM symbols of the preamble with the signalling data, modulating a plurality of OFDM symbols with the payload data for transmission in each of the sub-frames, and transmitting the OFDM symbols carrying the signalling data of the preamble and the payload data in the plurality of sub-frames, wherein the preamble signal forms a start of each frame and comprises one or more OFDM symbols carrying the L1 signalling data, a first of the one or more OFDM symbols carrying a fixed length part of the L1 signalling data of a predetermined size, the fixed length L1 signalling data indicating communications parameters for detecting a variable length part of the remaining L1 signalling data carried in the remaining one or more OFDM symbols of the preamble, and the bootstrap signal comprises one or more OFDM symbols carrying an indication of communications parameters for detecting the fixed length L1 signalling data carried by the first of the one or more OFDM symbols of the preamble signal.

16. A method of detecting and recovering payload data from a received signal, the method comprising detecting the received signal, the received signal having been formed and transmitted by a transmitter to carry the payload data as Orthogonal Frequency Division Multiplexed (OFDM) symbols in one or more of a plurality of time divided frames, each frame including a bootstrap signal, a preamble signal and a plurality of sub-frames each of which carries the payload data in a plurality of OFDM symbols, the preamble signal forming a start of each frame and comprising one or more OFDM symbols carrying layer 1, L1, signalling data for detecting the payload data carried by the frame, a first of the one or more OFDM symbols carrying a fixed length part of the L1 signalling data of a predetermined size, the fixed length L1 signalling data indicating communications parameters for detecting a variable length part of the L1 signalling data carried in the remaining one or more OFDM symbols of the preamble signal, and the bootstrap signal comprising one or more OFDM symbols carrying an indication of communications parameters for detecting the fixed length L1 signalling data carried by the first of the one or more OFDM symbols of the preamble signal, converting a useful part of the one or more of the bootstrap OFDM symbols, the preamble OFDM symbols and the payload OFDM symbols into the frequency domain, detecting the one or more bootstrap OFDM symbols to identify the communications parameters for detecting the fixed length L1 signalling data from the first of the OFDM symbols of the preamble signal, detecting the fixed length L1 signalling data from the first of the OFDM symbols of the preamble to identify the communications parameters for detecting the variable length L1 signalling data from the remaining one or more OFDM symbols of the preamble signal, detecting the variable length L1 signalling data from the remaining one or more OFDM symbols of the preamble signal, and using the fixed and variable length L1 signalling data to detect the payload data.

17. A computer program providing computer executable instructions which when loaded onto a computer causes the computer to perform the method according to Clause 15 or Clause 16.

Second further embodiments of the disclosure are defined by the following numbered clauses:

1. A receiver comprising:

radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of sub-frames each of which carry payload data modulated on a plurality of second OFDM symbols, the preamble signal comprising one or more OFDM symbols modulated with signalling data, the Fast Fourier Transform (FFT) size of the one or more OFDM symbols of the preamble signal being the same FFT size as for the second OFDM symbols of first of the plurality of subframes; and demodulator circuitry configured to detect the signalling data from the OFDM symbols of the preamble signal and to use the signalling data to detect the payload data modulated on the second OFDM symbols of the first of the subframes.

2. The receiver as defined in Clause 1, wherein each time divided frame begins with the bootstrap signal immediately followed in time by the one or more preamble OFDM symbols which are immediately followed in time by the first of the subframes which is immediately followed by at least one further subframe and the demodulator is configured to use the signalling data to detect the payload data modulated on the second OFDM symbols of the at least one further subframe.

3 The receiver as defined in Clause 2 wherein the further subframe comprises second OFDM symbols having a different FFT size to the second OFDM symbols which comprise the first of the subframes.

4. The receiver as defined in Clause 1 wherein, the bootstrap signal comprises a number of symbols including a synchronization symbol having a number of subcarriers which is smaller than the number of subcarriers of the FFT size of the one or more OFDM symbols of the preamble.

5. The receiver as defined in Clause 1, wherein the demodulator circuitry is configured to detect the bootstrap signal and determine the FFT size of the first OFDM symbol of the preamble which is indicated by the bootstrap signal in signalling bits.

6. The receiver as defined in Clause 1, wherein the demodulator comprises Fast Fourier Transform (FFT) circuitry configured to transform OFDM symbols of the preamble symbol and second OFDM symbols from the frequency domain to the time domain, the second ODFM symbols of a first of the subframes having a different FFT size to the second OFDM symbols of at least one further subframe.

7. The receiver as defined in Clause 1 being configured to receive a television signal.

8. The receiver as defined in Clause 1 being an ATSC television receiver

9. The receiver as defined in Clause 1, further comprising a display to which the detected payload data is output.

10. A method comprising:

detecting a received signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more OFDM symbols modulated with signalling data, the Fast Fourier Transform (FFT) size of the one or more OFDM symbols of the preamble signal being the same FFT size as for the second OFDM symbols of first of the plurality of subframes; and detecting by demodulation circuitry the signalling data from the OFDM symbols of the preamble signal and to use the signalling data to detect the payload data modulated on the second OFDM symbols of the first of the subframes.

11. A non-transitory computer readable medium including computer program instructions, which when executed by a computer causes the computer to perform the method of clause 10.

12. A transmitter for transmitting payload data using Orthogonal Frequency Division Multiplexed (OFDM) symbols, the transmitter comprising a frame builder configured to receive the payload data and signalling data and to form the payload data with the signalling data into a plurality of time divided frames for transmission, each of the time divided frames including a bootstrap signal, a preamble signal and a plurality of subframes, a modulator configured to modulate one or more OFDM symbols of the preamble signal with the signalling data and to modulate a plurality of second OFDM symbols with the payload data for transmission in each of the subframes wherein the Fast Fourier Transform (FFT) size of the one or more OFDM symbols of the preamble is the same FFT size as for the plurality of second OFDM symbols modulated with payload data in the first of the subframes, and a transmission circuit for transmitting the OFDM symbols carrying the signalling data of the preamble and the payload data in the plurality of subframes.

13. The transmitter as defined in Clause 12, wherein each time divided frame begins with a bootstrap signal immediately followed in time by the one or more OFDM symbols of the preamble which are immediately followed in time by the first of the subframes which is immediately followed by at least one further subframe.

14. The transmitter as defined in Clause 13, wherein the further subframe comprises second OFDM symbols having a different FFT size to the second OFDM symbols which comprise the first of the subframes.

15. The transmitter as defined in Clause 12, wherein the bootstrap signal comprises a number of symbols including a synchronization symbol having a number of sub-carriers which is smaller than the number of sub-carriers of the FFT size of the one or more OFDM symbols of the preamble.

16. The transmitter as defined in Clause 12, wherein the FFT size of the first OFDM symbol of the preamble and the FFT size of the second OFDM symbols of the first subframe is indicated by the bootstrap signal.

17. A method comprising receiving the payload data and signalling data and forming the payload data with the signalling data into a plurality of time divided frames for transmission, each of the time divided frames including a bootstrap signal, a preamble signal and a plurality of subframes, modulating one or more Orthogonal Frequency Division Multiplexed (OFDM) symbols of the preamble with the signalling data and modulating a plurality of second OFDM symbols with the payload data for transmission in each of the plurality of subframes wherein the FFT size of the one or more OFDM symbols of the preamble signal is the same FFT size as for the plurality of second OFDM symbols modulated with payload data in the first of the subframes, and transmitting the OFDM symbols carrying the signalling data of the preamble and the payload data in the plurality of subframes.

Third further embodiments of the disclosure are defined by the following numbered clauses:

1. A receiver comprising:

radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more OFDM symbols modulated with signalling data, and having a guard interval with a duration which is the same as or greater than the guard interval duration of the one or more OFDM symbols of a first of the subframes of each frame; and demodulator circuitry configured to detect the signalling data from the OFDM symbols of the preamble signal and to use the signalling data to detect the payload data modulated on the second OFDM symbols of the first of the subframes.

2. The receiver as defined in Clause 1, wherein each time divided frame begins with a bootstrap signal immediately followed in time by the one or more preamble OFDM symbols which are immediately followed in time by the first of the subframes which is immediately followed in time by at least one further subframe.

3. The receiver as defined in Clause 1, wherein the bootstrap signal comprises a plurality of symbols including a synchronization symbol having a number of subcarriers which is smaller than the number of subcarriers of the one or more OFDM symbols of the preamble, the demodulator circuitry using the synchronization symbol to detect the signalling data from the OFDM symbols of the preamble signal.

4. The receiver as defined in Clause 3, wherein at least one of the plurality of symbols of the bootstrap signal include an indication of communication parameters, the communication parameters including at least an indication of the guard interval duration of at least one the OFDM symbols of the preamble signal, the demodulator circuitry using the at least an indication of the guard interval duration to detect the signalling data from the OFDM symbols of the preamble signal.

5. The receiver as defined in Clause 3, wherein at least one of the plurality of symbols of the bootstrap signal include an indication of communication parameters, the communication parameters including at least an indication of the guard interval duration of all of the OFDM symbols of the preamble of a time divided frame, the demodulator circuitry using the at least an indication of the guard interval duration to detect the signalling data from the OFDM symbols of the preamble signal.

6. The receiver as defined in Clause 1, wherein the guard interval duration comprises a number of samples.

7. The receiver as defined in Clause 2, wherein the guard interval duration of the first of the subframes is different for the at least one further subframe.

8. The receiver as defined in Clause 1 being configured to receive a television signal.

9. The receiver as defined in Clause 1 being an ATSC television receiver

10. The receiver as defined in Clause 1, further comprising a display to which the detected payload data is output.

11. A method comprising:

detecting a received signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more OFDM symbols modulated with signalling data, and having a guard interval with a duration which is the same as or greater than the guard interval duration of the one or more OFDM symbols of a first of the subframes of each frame; and detecting the signalling data from the OFDM symbols of the preamble signal and using the signalling data to detect the payload data modulated on the second OFDM symbols of the first of the subframes.

12. A transmitter for transmitting payload data using Orthogonal Frequency Division Multiplexed (OFDM) symbols, the transmitter comprising a frame builder configured to receive the payload data and signalling data and to form the payload data with the signalling data into a plurality of time divided frames for transmission, each of the time divided frames including a bootstrap signal, a preamble signal and a plurality of subframes, a modulator configured to modulate one or more OFDM symbols of the preamble signal with the signalling data and to modulate a plurality of second OFDM symbols with the payload data for transmission in each of the plurality of subframes, wherein the modulator is configured with the frame builder to generate the OFDM symbols of the preamble signal with a guard interval duration which is the same as or greater than the guard interval duration of the one or more OFDM symbols of a first of the subframes of each frame and a transmission circuit for transmitting the OFDM symbols carrying the signalling data of the preamble and the payload data in the plurality of subframes.

13. The transmitter as defined in Clause 12, wherein each time divided frame begins with a bootstrap signal immediately followed in time by the one or more preamble OFDM symbols which are immediately followed in time by the first of the subframes which is immediately followed in time by at least one further subframe.

14. The transmitter as defined in Clause 12, wherein the bootstrap signal comprises a plurality of symbols including a synchronization symbol having a number of subcarriers which is smaller than the number of subcarriers of the one or more OFDM symbols of the preamble.

15. The transmitter as defined in Clause 14, wherein at least one of the plurality of symbols include an indication of communication parameters, the communication parameters including at least an indication of the guard interval duration of at least one the OFDM symbols of the preamble signal.

16. The transmitter as defined in Clause 14, wherein at least one of the plurality of symbols include an indication of communication parameters, the communication parameters including at least an indication of the guard interval duration of all of the OFDM symbols of the preamble of a time divided frame.

17. The transmitter as defined in Clause 12, wherein the guard interval duration comprises a number of samples.

18. The transmitter as defined in Clause 13, wherein the guard interval duration of the first of the subframes is different for the at least one further subframe.

19. A method comprising receiving payload data and signalling data and to form the payload data with the signalling data into a plurality of time divided frames for transmission, each of the time divided frames including a bootstrap signal, a preamble signal and a plurality of subframes, modulating one or more Orthogonal Frequency Division Multiplexed (OFDM) symbols of the preamble signal with the signalling data and modulating a second plurality of OFDM symbols with the payload data for transmission in each of the plurality of subframes, generating the OFDM symbols of the preamble signal with a guard interval duration which is the same as or greater than the guard interval duration of the one or more OFDM symbols of a first of the subframes of each frame and transmitting the OFDM symbols carrying the signalling data of the preamble and the payload data in the plurality of subframes 20. A non-transitory computer readable medium including computer program instructions, which when executed by a computer causes the computer to perform the method of clause 11.

Fourth further embodiments of the disclosure are defined by the following numbered clauses:

1. A receiver comprising:

radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, and each of the one or more second OFDM symbols of the plurality of subframes includes scattered pilot sub-carriers at locations in the second OFDM symbols according to a predetermined pattern, the scattered pilot sub-carriers being included in each second OFDM symbol at locations displaced with respect to a sub-carrier in a previous second OFDM symbol by a predetermined value, and the one or more OFDM symbols of the preamble signal each include pilot sub-carrier symbols at sub-carrier locations corresponding to any sub-carrier location at which a scattered pilot sub-carrier has been transmitted in any of the second OFDM symbols of a following subframe, and demodulator circuitry configured to detect the signalling data from the OFDM symbols of the preamble signal and to use the signalling data to detect the payload data modulated on the second OFDM symbols of the first of the subframes.

2. The receiver as defined in Clause 1 wherein the said following subframe is the first of the subframes.

3. The receiver as defined in Clause 2, wherein each time divided frame begins with the bootstrap signal immediately followed in time by the one or more preamble OFDM symbols which are immediately followed in time by the first of the subframes which is immediately followed by at least one further subframe and the demodulator circuitry is configured to use the signalling data to detect the payload data modulated on the second OFDM symbols of the at least one further subframe.

4. The receiver as defined in Clause 1, wherein the bootstrap signal comprises a number of symbols including a synchronization symbol having a number of sub-carriers which is smaller than the number of subcarriers of a first of one or more OFDM symbols of the preamble.

5. The receiver as defined in Clause 4, wherein at least one of the number of symbols include an indication of communication parameters, the communication parameters including at least an indication of the sub carrier locations at which pilot-sub carriers are generated in the one or more preamble OFDM symbols.

6. The receiver as defined in Clause 1 being configured to receive a television signal.

7. The receiver as defined in Clause 1 being an ATSC television receiver.

8. The receiver as defined in Clause 1, further comprising a display to which the detected payload data is output.

9. A method comprising:

detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and each of the one or more second OFDM symbols of the plurality of subframes includes scattered pilot sub-carriers at locations in the second OFDM symbols according to a predetermined pattern, the scattered pilot sub-carriers being included in each second OFDM symbol at locations displaced with respect to a sub-carrier in a previous second OFDM symbol by a predetermined value, and the one or more OFDM symbols of the preamble signal each include pilot sub-carrier symbols at sub-carrier locations corresponding to any sub-carrier location at which a scattered pilot sub-carrier has been transmitted in any of the second OFDM symbols of a following subframe, and detecting the signalling data from the OFDM symbols of the preamble signal and to use the signalling data to detect the payload data modulated on the second OFDM symbols of the first of the subframes.

10. A non-transitory computer readable medium including computer program instructions, which when executed by a computer causes the computer to perform the method of clause 9.

11. A transmitter for transmitting payload data using Orthogonal Frequency Division Multiplexed (OFDM) symbols, the transmitter comprising:

a frame builder configured to receive the payload data and signalling data and to form the payload data with the signalling data into a plurality of time divided frames for transmission, each of the time divided frames including a bootstrap signal, a preamble signal and a plurality of subframes, a modulator configured to modulate one or more OFDM symbols of the preamble with the signalling data and to modulate a plurality of second OFDM symbols with the payload data for transmission in each of the subframes wherein the modulator is configured with the frame builder to generate, for each subframe, one or more second OFDM symbols carrying the payload data, and each of the one or more second OFDM symbols of the subframe includes scattered pilot sub-carriers at locations in the second OFDM symbols according to a predetermined pattern, the scattered pilot sub-carriers being transmitted in each second OFDM symbol at locations displaced with respect to a sub-carrier in a previous second OFDM symbol by a predetermined value, and the one or more OFDM symbols of the preamble signal each include pilot sub-carrier symbols at sub-carrier locations corresponding to any sub-carrier location at which a scattered pilot sub-carrier is transmitted in any of the OFDM symbols of a following subframe, and a transmission circuit for transmitting the OFDM symbols carrying the signalling data of the preamble and the payload data in the plurality of subframes.

12. The transmitter as defined in Clause 11, wherein the said following subframe is the first of the subframes.

13. The transmitter as defined in Clause 12, wherein each time divided frame beginnings with a bootstrap signal immediately followed by the one or more preamble OFDM symbols which are immediately followed by the first of the subframes which is followed by at least one further subframe.

14. The bootstrap signal comprising a number of symbols including a synchronization symbol having a number of sub-carriers which is smaller than the number of subcarriers of a first of one or more OFDM symbols of the preamble.

15. The transmitter as defined in Clause 14, wherein at least one of the number of symbols includes an indication of communication parameters, the communication parameters including at least an indication of the sub carrier locations at which pilot-sub carriers are generated in the one or more preamble OFDM symbols.

16. A method comprising:

receiving the payload data and signalling data and to form the payload data with the signalling data into a plurality of time divided frames for transmission, each of the time divided frames including a bootstrap signal, a preamble signal and a plurality of subframes, modulating one or more Orthogonal Frequency Division Multiplexed (OFDM) symbols of the preamble with the signalling data and modulating a plurality of second OFDM symbols with the payload data for transmission in each of the subframes and generating, for each subframe, one or more second OFDM symbols carrying the payload data, and each of the one or more second OFDM symbols of the subframe includes scattered pilot sub-carriers at locations in the second OFDM symbols according to a predetermined pattern, transmitting the scattered pilot sub-carriers in each second OFDM symbol at locations displaced with respect to a sub-carrier in a previous second OFDM symbol by a predetermined value, and the one or more OFDM symbols of the preamble signal each include pilot sub-carrier symbols at sub-carrier locations corresponding to any sub-carrier location at which a scattered pilot sub-carrier is transmitted in any of the OFDM symbols of a following subframe, and transmitting the OFDM symbols carrying the signalling data of the preamble and the payload data in the plurality of subframes.

Fifth further embodiments of the disclosure are defined by the following numbered clauses:

1. A receiver comprising:
radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and each of the one or more second OFDM symbols of the subframe including scattered pilot sub-carriers at locations in the second OFDM symbols according to a predetermined pattern, the scattered pilot sub-carriers being received in each second OFDM symbol at locations displaced with respect to a sub-carrier in a previous second OFDM symbol by a value, and the one or more OFDM symbols of the preamble signal each include pilot sub-carrier symbols at sub-carrier locations corresponding to any sub-carrier location at which a scattered pilot sub-carrier is received in a first of the second OFDM symbol of a following subframe and in which a greater number of pilot sub-carriers at sub-carrier locations are received than sub-carrier locations at which scattered pilot sub-carriers are received in the first of the second OFDM symbols of the following subframe, and
demodulator circuitry configured to detect the signalling data from the OFDM symbols of the preamble signal and to use the signalling data to detect the payload data modulated on the second OFDM symbols of the first of the subframes.

2. The receiver as defined in Clause 1, wherein the said following subframe is the first of the plurality of subframes.

3. The receiver as defined in Clause 2, wherein each time divided frame begins with a bootstrap signal immediately followed by the one or more preamble OFDM symbols which are immediately followed by the first of the subframes which is followed by at least one further subframe.

4. The receiver as defined in Clause 1, wherein the bootstrap signal comprises a number of symbols including a synchronization symbol having a number of sub-carriers which is smaller than the number of subcarriers of a first of one or more OFDM symbols of the preamble.

5. The receiver as defined in Clause 4, wherein at least one of the number of symbols include an indication of communication parameters, the communication parameters including at least an indication of the sub carrier locations at which pilot-sub carriers are located in the one or more OFDM symbols of the preamble.

6. The receiver as defined in Clause 1, wherein the said value by which scattered pilot sub-carrier locations are displaced between a second OFDM symbol and the previous second OFDM symbol corresponds to a displacement between pilot sub-carrier locations in each of the one or mode OFDM symbols of the preamble.

7. The receiver as defined in Clause 6, wherein the demodulator uses the greater number of pilot sub-carriers at sub-carrier locations of the at least one OFDM symbol of the preamble to detect the payload data.

8. The receiver as defined in Clause 1 being configured to receive a television signal.

9. The receiver as defined in Clause 1 being an ATSC television receiver.

10. The receiver as defined in Clause 1, further comprising a display to which the detected payload data is output.

11. A receiving method comprising:
detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and each of the one or more second OFDM symbols of the plurality of subframes including scattered pilot sub-carriers at locations in the second OFDM symbols according to a predetermined pattern, the scattered pilot sub-carriers being received in each second OFDM symbol at locations displaced with respect to a sub-carrier in a previous second OFDM symbol by a value, and the one or more OFDM symbols of the preamble signal each include pilot sub-carrier symbols at sub-carrier locations corresponding to any sub-carrier location at which a scattered pilot sub-carrier is received in a first of the second OFDM symbol of a following subframe and in which a greater number of pilot sub-carriers at sub-carrier locations are received than sub-carrier locations at which scattered pilot sub-carriers are received in the first of the second OFDM symbols of the following subframe, and
detecting the signalling data from the OFDM symbols of the preamble signal and to use the signalling data to detect the payload data modulated on the second OFDM symbols of the first of the subframes.

12. A non-transitory computer readable medium including computer program instructions, which when executed by a computer causes the computer to perform the method of clause 11.

13. A transmitter for transmitting payload data using Orthogonal Frequency Division Multiplexed (OFDM) symbols, the transmitter comprising:
a frame builder configured to receive the payload data and signalling data and to form the payload data with the signalling data into a plurality of time divided frames for transmission, each of the time divided frames including a bootstrap signal, a preamble signal and a plurality of subframes,
a modulator configured to modulate one or more OFDM symbols of the preamble with the signalling data and to modulate a plurality of second OFDM symbols with the payload data for transmission in each of the subframes wherein the modulator is configured with the frame builder to generate, for each subframe, one or more second OFDM symbols carrying the payload data, and each of the one or more second OFDM symbols of the subframe includes scattered pilot sub-carriers at locations in the second OFDM symbols according to a predetermined pattern, the scattered pilot sub-carriers being transmitted in each second OFDM symbol at locations displaced with respect to a sub-carrier in a previous second OFDM symbol by a value, and the one or more OFDM symbols of the preamble signal each include pilot sub-carrier symbols at sub-carrier locations corresponding to any sub-carrier location at which a scattered pilot sub-carrier is transmitted in a first of the second OFDM symbol of a following subframe and in which a greater number of pilot sub-carriers at sub-carrier locations are transmitted than sub-carrier locations at which scattered pilot sub-carriers are transmitted in the first of the second OFDM symbols of the following subframe, and
a transmission circuit for transmitting the OFDM symbols carrying the signalling data of the preamble and the payload data in the plurality of subframes.

14. The transmitter as defined in Clause 13, wherein the said following subframe is the first of the plurality of subframes.

15. The transmitter as defined in Clause 13, wherein each time divided frame begins with a bootstrap signal immediately followed by the one or more preamble OFDM symbols which are immediately followed by the first of the subframes which is followed by at least one further subframe.

16. The transmitter as defined in Clause 13 wherein the bootstrap signal comprises a number of symbols including a synchronization symbol having a number of sub-carriers which is smaller than the number of subcarriers of a first of one or more OFDM symbols of the preamble.

17. The transmitter as defined in Clause 16, wherein at least one of the number of symbols include an indication of communication parameters, the communication parameters including at least an indication of the sub carrier locations at which pilot-sub carriers are generated in the one or more OFDM symbols of the preamble.

18. The transmitter as defined in Clause 13, wherein the said value by which scattered pilot sub-carrier locations are displaced between a second OFDM symbol and the previous second OFDM symbol corresponds to a displacement between pilot sub-carrier locations in each of the one or mode OFDM symbols of the preamble.

19. A method comprising:

receiving payload data and signalling data and forming m the payload data with the signalling data into a plurality of time divided frames for transmission, each of the time divided frames including a bootstrap signal, a preamble signal and a plurality of subframes, modulating one or more Orthogonal Frequency Division Multiplexed (OFDM) symbols of the preamble with the signalling data and modulating a plurality of second OFDM symbols with the payload data for transmission in each of the subframes;

generating, for each subframe, one or more second OFDM symbols carrying the payload data, and each of the one or more second OFDM symbols of the subframe including scattered pilot sub-carriers at locations in the second OFDM symbols according to a predetermined pattern, the scattered pilot sub-carriers in each second OFDM symbol at locations being displaced with respect to a sub-carrier in a previous second OFDM symbol by a value, and the one or more OFDM symbols of the preamble signal each include pilot sub-carrier symbols at sub-carrier locations corresponding to any sub-carrier location at which a scattered pilot sub-carrier is located in a first of the second OFDM symbol of a following subframe;

transmitting a greater number of pilot sub-carriers at sub-carrier locations than sub-carrier locations at which scattered pilot sub-carriers are located in the first of the second OFDM symbols of the following subframe, and transmitting the OFDM symbols carrying the signalling data of the preamble and the payload data in the plurality of subframes.

Sixth further embodiments of the disclosure are defined by the following numbered clauses:

1. A receiver comprising:

radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and a first of the one or more OFDM symbols carries a fixed length part of the signalling data of a predetermined size, the fixed length signalling data indicating communications parameters for detecting a variable length part of signalling data carried in any remaining part of the first of the one or more OFDM symbols and in a second of the one or more OFDM symbols; and demodulator circuitry configured to detect the signalling data from the one or more OFDM symbols of the preamble signal and to use the fixed length part of the signalling data and the variable length part of the signalling data to detect the payload data modulated on the second OFDM symbols of the subframes.

2. The receiver as defined in Clause 1, wherein all of the fixed length part of the signalling data is carried in the first of the one or more OFDM symbols of the preamble.

3. The receiver as defined in Clause 1, wherein the fixed length part of the signalling data includes an indication of the number of preamble OFDM symbols.

4. The receiver as defined in Clause 1, comprising first deinterleaver circuitry configured to deinterleave the variable length part of the signalling data from more than one of the OFDM symbols of the preamble.

5. The receiver as defined in Clause 4, wherein the fixed length part of the signalling data is not deinterleaved by the first deinterleaver circuitry.

6. The receiver as defined in Clause 4, wherein the first deinterleaver circuitry is configured to deinterleave the variable length part of the signalling data in time.

7. The receiver as defined in Clause 4, wherein the first deinterleaver circuitry is a time deinterleaver.

8. The receiver as defined in Clause 1, comprising frequency deinterleaver circuitry configured to deinterleave both of the variable length part of signalling data and fixed length part of the signalling data in OFDM symbols of the preamble.

9. The receiver as defined in Clause 8, wherein the frequency deinterleaver circuitry is configured to deinterleave all of the variable and fixed length parts of signalling data across the sub-carriers of an OFDM symbol.

10. The receiver as defined in Clause 4, further comprising a frequency deinterleaver configured to deinterleave both the fixed length part of the signalling data and deinterleaved variable length part of the signalling data.

11. The receiver as defined in Clause 1 being configured to receive a television signal.

12. The receiver as defined in Clause 1 being an ATSC television receiver.

13. The receiver as defined in Clause 1, further comprising a display to which the detected payload data is output.

14 A method comprising:

detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and a first of the one or more OFDM symbols carries a fixed length part of the signalling data of a predetermined size, the fixed length part of the signalling data indicating communications parameters for detecting a variable length part of the signalling data carried in any remaining part of the first of the one or more OFDM symbols and in a second of the one or more OFDM symbols; and detecting the signalling data from the one or more OFDM symbols of the preamble signal and using the fixed length part of the signalling data and the variable length part of the signalling data to detect the payload data modulated on the second OFDM symbols of the subframes.

15. A non-transitory computer readable medium including computer program instructions, which when executed by a computer causes the computer to perform the method of clause 14.

16. A transmitter for transmitting payload data using Orthogonal Frequency Division Multiplexed (OFDM) symbols, the transmitter comprising:
   a frame builder configured to receive the payload data and signalling data and to form the payload data with the signalling data into a plurality of time divided frames for transmission, each of the time divided frames including a bootstrap signal, a preamble signal and a plurality of subframes,
   a modulator configured to modulate one or more OFDM symbols of the preamble signal with the signalling data and to modulate a plurality of OFDM symbols with the payload data for transmission in each of the subframes, and
   a transmission circuit for transmitting the OFDM symbols carrying the signalling data of the preamble and the payload data in the plurality of subframes, wherein
   the preamble signal comprises one or more OFDM symbols carrying the signalling data, a first of the one or more OFDM symbols carrying a fixed length part of the signalling data of a predetermined size, the fixed length part of the signalling data indicating communications parameters for detecting a variable length part of signalling data carried in any remaining part of the first of the one or more OFDM symbols and in a second of the one or more OFDM symbols.

17. The transmitter as defined in Clause 16, wherein all of the fixed length part of the signalling data is carried in the first of the one or more OFDM symbols of the preamble.

18. The transmitter as defined in Clause 16, wherein the fixed length part of the signalling data includes an indication of the number of preamble OFDM symbols.

19. The transmitter as defined in Clause 16, comprising first interleaver circuitry configured to interleave the variable length part of the signalling data onto more than one of the OFDM symbols of the preamble.

20. The transmitter as defined in Clause 19, wherein the fixed length part of the signalling data is not interleaved by the first interleaver circuitry.

21. The transmitter as defined in Clause 19, wherein the first interleaver circuitry is configured to interleave the variable length part of the signalling data in time.

22. The transmitter as defined in Clause 19, wherein the first interleaver circuitry is a time interleaver.

23. The transmitter as defined in Clause 16, comprising frequency interleaver circuitry configured to interleave both of the variable length part of signalling data and fixed length part of the signalling data in OFDM symbols of the preamble.

24. The transmitter as defined in Clause 23, wherein the frequency interleaver circuitry is configured to interleave all of the variable and fixed length parts of signalling data across the sub-carriers of an OFDM symbol.

25. The transmitter as defined in Clause 19, further comprising frequency interleaver circuitry configured to interleave both the fixed length part of the signalling data and interleaved variable length part of the signalling data.

Seventh further embodiments of the disclosure are defined by the following numbered clauses:

1. A receiver configured to recover payload data from Orthogonal Frequency Division Multiplexed (OFDM) representing time-divided frame, the receiver comprising circuitry configured to:
   detect a plurality of bootstrap symbols of the time divided frame and from a first bootstrap symbol synchronize the circuitry in frequency;
   detect a plurality of preamble OFDM symbols and to recover signalling data therefrom using parameters detected from the plurality of bootstrap symbols; and
   frequency deinterleaver circuitry configured to deinterleave, in frequency, fixed length signalling data modulated onto a first part of a first preamble OFDM symbol of the time-divided frame and variable length signalling data modulated onto both a second part of the first preamble OFDM symbol and at least one second preamble OFDM symbol of the time-divided frame.

2. The receiver as defined in Clause 1, wherein the frequency deinterleaver circuitry is further configured to deinterleave, in frequency, payload data from a preamble OFDM symbol but not to deinterleave, in frequency, payload data from a subframe of the time-divided frame.

3. The receiver as defined in Clause 2, comprising second deinterleaver circuitry configured to deinterleave the variable length signalling data interleaved between more than one of the preamble symbols, and wherein the circuitry is further configured to use the deinterleaved signalling data to recover the payload data.

4. The receiver as defined in Clause 3, wherein the payload data comprised in a plurality of subframes.

5. The receiver as defined in Clause 4, wherein the circuitry is configured to also recover payload data from a portion of a preamble OFDM symbol.

6. The receiver as defined in Clause 1, wherein the Fast Fourier Transform (FTT) size of the plurality of preamble symbols is the same FFT size as the OFDM symbols of a first subframe in a time direction of the time-divided frame, the first subframe comprising payload data.

7. The receiver as defined in Clause 6, wherein the FFT size of OFDM symbols of a second subframe in a time direction is different to that of the first subframe of the time-divided frame.

8. The receiver as defined in Clause 1, wherein a guard interval duration of the plurality of preamble symbols is the same guard interval duration as OFDM symbols modulated with payload data of a first subframe in a time direction of the time-divided frame.

9. The receiver as defined in Clause 8, wherein the guard interval duration of OFDM symbols of a second subframe in a time direction is different to that of the first subframe of the time-divided frame.

10. The receiver as defined in Clause 8, wherein the signalling data indicates whether the frequency deinterlever circuitry is to be configured to operate on OFDM symbols modulated with payload data of each of the plurality of subframes of the time-divided frames.

11. The receiver as defined in Clause 1 being configured to receive a television signal.

12. The receiver as defined in Clause 1 being an ATSC television receiver.

13. The receiver as defined in Clause 1, further comprising a display to which the detected payload data is output.

14. A method for recovering payload data from Orthogonal Frequency Division Multiplexed (OFDM) representing time-divided frame, the method comprising:
   detecting a plurality of bootstrap symbols of the time divided frame and based on a first bootstrap symbol synchronizing the circuitry in frequency;
   detecting a plurality of preamble OFDM symbols and recovering signalling data therefrom using parameters detected from the plurality of bootstrap symbols; and deinterleaving in frequency fixed length signalling data modulated onto a first part of a first preamble OFDM symbol of the time-divided frame and variable length signalling data modulated onto both a second part of the first preamble OFDM symbol and at least one second preamble OFDM symbol of the time-divided frame.

15. The method as defined in Clause 14, comprising deinterleaving the variable length signalling data interleaved between more than one of the preamble symbols, and using the deinterleaved variable length signalling data to recover the payload data.

16. A non-transitory computer readable medium including computer program instructions, which when executed by a computer causes the computer to perform the method of clause 14.

17. A transmitter comprising:
a frame builder configured to receive signalling data and to form the signalling data into a time-divided frame with a bootstrap signal comprising a plurality of bootstrap symbols including a first bootstrap symbol which is a synchronization symbol;
a modulator configured to modulate one or more Orthogonal Frequency Division Multiplexed (OFDM) symbols of a preamble with the signalling data, the signalling data comprising fixed length signalling data and variable length signalling data, the modulator modulating the fixed length signalling data onto a first part of a first preamble OFDM symbol and modulating the variable length signalling data onto both a second part of the first preamble OFDM symbol and at least one second preamble OFDM symbol;
frequency interleaver circuitry configured to interleave in frequency the fixed length signalling data and the variable length signalling data modulated on the first preamble OFDM symbol and configured to interleave in frequency the variable length signalling data modulated on the at least one second OFDM symbol; and a transmission circuit for transmitting the OFDM symbols carrying the signalling data of the preamble and the plurality of bootstrap symbols.

18. A method comprising:
receiving signalling data and forming the signalling data into a time-divided frame with a bootstrap signal comprising a plurality of bootstrap symbols including a first bootstrap symbol which is a synchronization symbol;
modulating one or more Orthogonal Frequency Division Multiplexed (OFDM) symbols of a preamble with the signalling data, the signalling data comprising fixed length signalling data and variable length signalling data, the modulating comprising modulating the fixed length signalling data onto a first part of a first preamble OFDM symbol and modulating the variable length signalling data onto both a second part of the first preamble OFDM symbol and at least one second preamble OFDM symbol;
interleaving in frequency the fixed length signalling data and the variable length signalling data modulated on the first preamble OFDM symbol and interleaving in frequency the variable length signalling data modulated on the at least one second OFDM symbol; and transmitting the OFDM symbols carrying the signalling data of the preamble and the plurality of bootstrap symbols.

Eighth further embodiments of the disclosure are defined by the following numbered clauses:

1. A receiver configured to recover payload data from signal representing a time divided frame comprising circuitry configured to:
detect preamble Orthogonal Frequency Division Multiplexed (OFDM) and recover signalling data therefrom by frequency deinterleaving the preamble OFDM symbols;
recover, using the signalling data, payload data from both a part of the preamble OFDM symbols and a subframe of the time divided frame, the signalling data indicating that the payload data in the subframe is not frequency interleaved.

2. The receiver as defined in Clause 1 comprising frequency deinterleaver circuitry, configured to deinterleave signalling data modulated on preamble OFDM symbols and further configured to deinterleave payload data modulated on payload OFDM symbols in a subframe based on the signalling data.

3. The receiver as defined in Clause 2, wherein the frequency deinterleaver circuitry is configured not to deinterleave payload data modulated on payload OFDM symbols in a subframe based on the signalling data.

4. The receiver as defined in Clause 1, wherein the circuitry is configured to recover payload data using the signalling data from part of the preamble OFDM symbols, the said part of the preamble OFDM symbols including a preamble OFDM symbol on which both of part of variable length signalling data and payload data have been modulated.

5. The receiver as receiver as defined in Clause 1, wherein a first of the preamble OFDM symbols has fixed length signalling data modulated thereon.

6. The receiver as receiver as defined in Clause 5, wherein the fixed length signalling data includes an indication of the number of preamble OFDM symbols.

7. The receiver as defined in Clause 1, being configured to receive and decode a television signal.

8. The receiver as defined in Clause 1, being an ATSC television receiver.

9. The receiver as defined in Clause 1, further comprising a display to which the detected payload data is output.

10. A method for recovering payload data from a from signal representing a time divided frame, the method comprising:
detecting preamble Orthogonal Frequency Division Multiplexed (OFDM) and recovering signalling data therefrom by frequency deinterleaving the preamble OFDM symbols
recovering by circuitry, using the signalling data, payload data from both a part of the preamble OFDM symbols and a subframe of the time divided frame, the signalling data indicating that the payload data in the subframe is not frequency interleaved.

11. The method as defined in Clause 10 comprising:
deinterleaving signalling data modulated on preamble OFDM symbols; and
deinterleaving payload data modulated on payload OFDM symbols in a subframe based on the signalling data.

12. The method as defined in Clause 10 comprising:
deinterleaving signalling data modulated on preamble OFDM symbols; and
configuring frequency interleaver circuitry either to deinterleave payload data modulated on payload OFDM symbols in a subframe based on the signalling data or inhibit the frequency interleaver circuitry, the configuring being based on the signalling data.

13. A non-transitory computer readable medium including computer program instructions, which when executed by a computer causes the computer to perform the method of clause 10.

14. A non-transitory computer readable medium including computer program instructions, which when executed by a computer causes the computer to perform the method of clause 12.

15. A transmitter comprising:
a frame builder configured to receive signalling data and to form the signalling data into a time-divided frame with payload data;

a modulator configured to modulate one or more Orthogonal Frequency Division Multiplexed (OFDM) symbols of a preamble with the signalling data and to modulate payload data onto part of the OFDM symbols of the preamble and payload OFDM symbols;

frequency interleaver circuitry configured to frequency interleave the signalling data and payload data of the OFDM symbols of the preamble and conditionally to frequency interleave the payload data of the payload OFDM symbols;

a transmission circuit for transmitting the OFDM symbols of the preamble and carrying the signalling data of the preamble and the payload OFDM symbols, wherein the signalling data includes an indication of whether or not the payload data of the payload OFDM symbols are frequency interleaved.

16. A method comprising:

receiving signalling data and forming the signalling data into a time-divided frame with payload data;

modulating one or more Orthogonal Frequency Division Multiplexed (OFDM) symbols of a preamble with the signalling data and modulating payload data onto part of the OFDM symbols of the preamble and payload OFDM symbols;

frequency interleaving the signalling data and payload data of the OFDM symbols of the preamble and conditionally frequency interleaving the payload data of the payload OFDM symbols;

transmitting the OFDM symbols of the preamble and carrying the signalling data of the preamble and the payload OFDM symbols, wherein the signalling data includes an indication of whether or not the payload data of the payload OFDM symbols are frequency interleaved.

Ninth further embodiments of the disclosure are defined by the following numbered clauses:

1. A receiver configured to recover payload data from Orthogonal Frequency Division Multiplexed (OFDM) representing time-divided frame, the receiver comprising circuitry configured to:

detect a plurality of bootstrap symbols of the time divided frame and from a first bootstrap symbol synchronize the circuitry with a frequency band;

detect a plurality of preamble OFDM symbols and configured to recover signalling data therefrom using parameters detected from the plurality of bootstrap symbols, the plurality of preamble OFDM symbols having modulated thereon fixed length signalling data and variable length signalling data, the fixed length signalling data including an indication of the amount of variable length signalling data modulated on the preamble OFDM symbols; and use the detected signalling data including an indication of the amount of variable length signalling data to recover the payload data from a plurality of subframes of the time-divided frame.

2. The receiver as defined in Clause 1, wherein the amount of variable length signalling in the fixed length signalling is a number of bits.

3. The receiver as defined in Clause 1, wherein the amount of variable length signalling is sufficient for the circuitry to recover payload data from all of the plurality of subframes from the time-divided frame.

4. The receiver as defined in Clause 1, wherein the fixed length signalling data is modulated on part of the first of the plurality of preamble OFDM symbols.

5. The receiver as defined in Clause 4, wherein the fixed length signalling data is modulated on less than the entirety of the useful subcarriers of the first of the plurality of preamble OFDM symbols.

6. The receiver as defined in Clause 4, wherein the variable length signalling data is modulated on a remaining part of the first of the plurality of preamble OFDM symbols and at least one other of the plurality of preamble OFDM symbols.

7. The receiver as defined in Clause 4, comprising interleaver circuitry configured to interleave the variable length signalling data across part of the first of the plurality of preamble OFDM symbols and at least one other of the plurality of preamble OFDM symbols.

8. The receiver as defined in Clause 7, wherein the interleaver circuitry is configured not to interleave the fixed length signalling across multiple of the plurality of preamble OFDM symbols.

9. The receiver as defined in Clause 1, wherein the fixed length signalling data includes an indication of the number of preamble OFDM symbols of the time-divided frame and the circuitry is configured to the use the indication of the number of preamble OFDM symbols to detect the variable length signalling data and therefrom the payload data.

10. The receiver as defined in Clause 1, being configured to receive a television signal.

11. The receiver as defined in Clause 1, being an ATSC television receiver.

12. The receiver as defined in Clause 1, further comprising a display to which the detected payload data is output.

13. A method for recovering payload data from Orthogonal Frequency Division Multiplexed (OFDM) representing time-divided frame, the method comprising:

detecting a plurality of bootstrap symbols of the time divided frame and from a first bootstrap symbol synchronizing the receiver circuitry with a frequency band;

detecting a plurality of preamble OFDM symbols and recovering signalling data therefrom using parameters detected from the plurality of bootstrap symbols, the plurality of preamble OFDM symbols having modulated thereon fixed length signalling data and variable length signalling data, the fixed length signalling data including an indication of the amount of variable length signalling data modulated on the preamble OFDM symbols; and using the detected signalling data including an indication of the amount of variable length signalling data to recover the payload data from a plurality of subframes of the time-divided frame.

14. The method as defined in Clause 13 wherein the fixed length signalling data has been modulated on less than the entirety of the useful subcarriers of the first of the plurality of preamble OFDM symbols; and the variable length signalling data has been modulated on a remaining part of the first of the plurality of preamble OFDM symbols and at least one other of the plurality of preamble OFDM symbols.

15. A non-transitory computer readable medium including computer program instructions, which when executed by a computer causes the computer to perform the method of clause 13.

16. A transmitter configured to convey payload data as Orthogonal Frequency Division Multiplexed (OFDM) representing a time-divided frame, the transmitter comprising circuitry comprising:

frame builder circuitry configured to receive signalling data and to form the signalling data into a time-divided frame with a bootstrap signal comprising a plurality of bootstrap symbols including a first bootstrap symbol which is a synchronization symbol and to form payload data into a plurality of subframes;

a modulator configured to modulate one or more Orthogonal Frequency Division Multiplexed (OFDM) symbols of a preamble with the signalling data, the signalling data comprising fixed length signalling data and variable length signalling data, the fixed length signalling data including an indication of the amount of variable length signalling data modulated on the preamble OFDM symbols;

a transmission circuit for transmitting the OFDM symbols carrying the signalling data of the preamble, plurality of bootstrap symbols the plurality of subframes.

17. A method for conveying payload data as Orthogonal Frequency Division Multiplexed (OFDM) representing a time-divided frame, the method comprising:

receiving signalling data and forming the signalling data into a time-divided frame with a bootstrap signal comprising a plurality of bootstrap symbols including a first bootstrap symbol which is a synchronization symbol and forming payload data into a plurality of subframes;

modulating one or more Orthogonal Frequency Division Multiplexed (OFDM) symbols of a preamble with the signalling data, the signalling data comprising fixed length signalling data and variable length signalling data, the fixed length signalling data including an indication of the amount of variable length signalling data modulated on the preamble OFDM symbols;

transmitting the OFDM symbols carrying the signalling data of the preamble, the plurality of bootstrap symbols and the plurality of subframes.

Tenth further embodiments of the disclosure are defined by the following numbered clauses:

1. A receiver comprising:
radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, wherein the Fast Fourier Transform (FFT) size of the second OFDM symbols of one of the plurality of subframes is different to the FFT size of the second OFDM symbols of at least another of the subframes within a time-divided frame and wherein the FFT size of second OFDM symbols of the first subframe arranged in time in the time-divided frame is smaller than the FFT size of the second OFDM symbols of the at least another subframe; and demodulator circuitry configured to detect the signalling data from the OFDM symbols of the preamble signal and to use the signalling data to detect the payload data modulated on the second OFDM symbols of the first of the subframes.

2. The receiver as defined in Clause 1, wherein the demodulator is further configured to detect the at least another of the subframes using the signalling data.

3. The receiver as defined in Clause 1, wherein the FFT size of the one or more OFDM symbols modulated with the signalling data is the same as the FFT size of the second OFDM symbols of the first of the subframes.

4. The receiver as defined in Clause 1 being configured to receive a television signal.

5. The receiver as defined in Clause 1 being an ATSC television receiver.

6. The receiver as defined in Clause 1, further comprising a display to which the detected payload data is output.

7. A mobile television receiver comprising the receiver as defined in Clause 1, wherein the radio frequency demodulation circuitry is configured detect payload data from the subframes comprising second OFDM symbols having the smallest FFT size of the subframes included in the said time-divided frame.

8. A mobile television receiver comprising the receiver as defined in Clause 1, wherein the radio frequency demodulation circuitry is configured detect payload data from the first of the subframes comprising second OFDM symbols included in the said time-divided frame.

9. A mobile television receiver comprising the receiver as defined in Clause 1, wherein the demodulation circuitry is configured detect one or more OFDM symbols modulated with signalling data and the payload data from the first of the subframes comprising second OFDM symbols included in the said time-divided frame.

10. The mobile television receiver as defined in Clause 9, wherein the demodulator circuitry is configured to further detect any of the at least another subframes which are targeted for mobile television reception.

11. A method comprising:
detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, wherein the Fast Fourier Transform (FFT) size of the second OFDM symbols of one of the plurality of subframes is different to the FFT size of the second OFDM symbols of at least another of the subframes within a time-divided frame and wherein the FFT size of second OFDM symbols of the first subframe arranged in time in the time-divided frame is smaller than the FFT size of the second OFDM symbols of the at least another subframe; and detecting the signalling data from the OFDM symbols of the preamble signal and using the signalling data to detect the payload data modulated on the second OFDM symbols of the first of the subframes.

12. A non-transitory computer readable medium including computer program instructions, which when executed by a computer causes the computer to perform the method of clause 11.

13. A transmitter for transmitting payload data using Orthogonal Frequency Division Multiplexed (OFDM) symbols, the transmitter comprising a frame builder configured to receive the payload data and signalling data and to form the payload data with the signalling data into a plurality of time divided frames for transmission, each of the time divided frames including a bootstrap signal, a preamble signal and a plurality of subframes, a modulator configured to modulate one or more OFDM symbols of the preamble with the signalling data and to modulate a plurality of second OFDM symbols with the payload data for transmission in the subframes wherein the FFT size of the second OFDM symbols of one of the plurality of subframes is different to the FFT size of the second OFDM symbols of at least another of the subframes within a time-divided frame and wherein the FFT size of OFDM symbols of the first subframe arranged in time in the time-divided frame is smaller than the FFT size of OFDM symbols of the at least another subframe; and a transmission circuit for transmitting the OFDM symbols carrying the signalling data of the preamble and the payload data in the plurality of subframes.

14. A method comprising
receiving payload data and signalling data and forming the payload data with the signalling data into a plurality of time divided frames for transmission, each of the time divided frames including a bootstrap signal, a preamble signal and a plurality of subframes,
   a modulator configured to modulate one or more Orthogonal Frequency Division Multiplexed (OFDM) symbols of the preamble with the signalling data and to modulate a plurality of second OFDM symbols with the payload data for transmission in the subframes wherein the FFT size of the second OFDM symbols of one of the plurality of subframes is different to the FFT size of the second OFDM symbols of at least another of the subframes within a time-divided frame and wherein the FFT size of OFDM symbols of the first subframe arranged in time in the time-divided frame is smaller than the FFT size of OFDM symbols of the at least another subframe; and
   transmitting the OFDM symbols carrying the signalling data of the preamble and the payload data in the plurality of subframes.
Eleventh further embodiments of the disclosure are defined by the following numbered clauses:
1. A receiver comprising:
   radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, a first subframe following a last of the preamble OFDM symbols comprising a subframe boundary symbol only at the end of the subframe, and wherein subsequent subframes in the time-divided frame comprise subframe boundary symbols at subframe start and subframe end; and
   demodulator circuitry configured to detect the signalling data from the OFDM symbols of the preamble signal and to use the signalling data to detect the payload data modulated on the second OFDM symbols of the first of the subframes.
2. The receiver as defined in Clause 1, wherein pilots included in the subframe boundary symbols have a denser distribution that pilots in other second OFDM symbols of the subframes modulated with payload data.
3. The receiver as defined in Clause 1, wherein the last of the preamble OFDM symbols of a time-divided frame acts as a subframe boundary symbol for the first of the subframes of the time-divided frame.
4. The receiver as defined in Clause 1, wherein the Fast Fourier transform (FFT) size of the one or more OFDM symbols of the preamble is the same FFT size as for both of the plurality of second OFDM symbols modulated with payload data and subframe boundary symbol in the first of the subframes.
5. The receiver as defined in Clause 1, wherein the Fast Fourier transform (FFT) size of the boundary symbols of a respective subframe is the same size as the FFT size of the plurality of OFDM symbols modulated with payload data for the said respective subframe.
6. The receiver as defined in Clause 1, wherein a pilot pattern on sub-carriers of one or more OFDM symbols of the preamble corresponds to the scattered pilot pattern of sub-carriers on the plurality of OFDM symbols modulated with payload data and subframe boundary symbol in the first of the subframes.
7. The receiver as defined in Clause 1, wherein a pilot distribution displacement value on sub-carriers of one or more OFDM symbols of the preamble is the same as the pilot distribution displacement value of the scattered pilot pattern on sub-carriers of the plurality of OFDM symbols modulated with payload data and subframe boundary symbol in the first of the subframes
8. The receiver as defined in Clause 1, wherein the subframe boundary symbols comprise pilots and further comprise cells set to zero to balance the average power of the sub-frame boundary symbols.
9. The receiver as defined in Clause 1, being configured to receive a television signal.
10. The receiver as defined in Clause 1, being an ATSC television receiver.
11. The receiver as defined in Clause 1, further comprising a display to which the detected payload data is output.
12. A method comprising:
detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, a first subframe following a last of the preamble OFDM symbols comprising a subframe boundary symbol only at the end of the subframe and wherein subsequent subframes in the time-divided frame comprise subframe boundary symbols at subframe start and subframe end; and
detecting the signalling data from the OFDM symbols of the preamble signal and using the signalling data to detect the payload data modulated on the second OFDM symbols of the first of the subframes.
13. A non-transitory computer readable medium including computer program instructions, which when executed by a computer causes the computer to perform the method of clause 12.
14. A transmitter for transmitting payload data using Orthogonal Frequency Division Multiplexed (OFDM) symbols, the transmitter comprising
a frame builder configured to receive the payload data and signalling data and to form the payload data with the signalling data into a plurality of time divided frames for transmission, each of the time divided frames including a bootstrap signal, a preamble signal and a plurality of subframes,
   a modulator configured to modulate one or more OFDM symbols of the preamble with the signalling data and to modulate a plurality of second OFDM symbols with the payload data for transmission in the subframes wherein a first subframe following a last of the preamble OFDM symbols comprises a subframe boundary symbols only at the end of the subframe and wherein subsequent subframes in the time divided frame comprise subframe boundary symbols at subframe start and subframe end; and
a transmission circuit for transmitting the OFDM symbols carrying the signalling data of the preamble signal, and the payload data and subframe boundary symbols in the plurality of subframes.
15. A method comprising
   a frame builder configured to receive the payload data and signalling data and to form the payload data with the signalling data into a plurality of time divided frames for transmission, each of the time divided frames including a bootstrap signal, a preamble signal and a plurality of subframes, a modulator configured to modulate one or more Orthogonal Frequency Division Multiplexed (OFDM) symbols of the preamble with the signalling data and to modulate a plurality of second OFDM symbols with the payload data for transmission in the subframes wherein a first subframe following a last of the preamble OFDM symbols comprises a subframe boundary symbols only at the end of the subframe and wherein subsequent subframes in the time divided frame comprise subframe boundary symbols at subframe start and subframe end; and transmitting the OFDM symbols carrying the signalling data of the preamble signal, and the payload data and subframe boundary symbols in the plurality of subframes.

Twelfth further embodiments of the disclosure are defined by the following numbered clauses:

1. A receiver comprising:

radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data and each of the one or more second OFDM symbols of the subframe includes scattered pilot sub-carriers at locations in the second OFDM symbols according to a predetermined pattern, the scattered pilot sub-carriers in each second OFDM symbol being at locations displaced with respect to a sub-carrier in a previous second OFDM symbol by a predetermined value, at least one subframe including at least one subframe boundary OFDM symbol which includes pilot sub-carrier symbols at sub-carrier locations corresponding to any sub-carrier location at which a scattered pilot sub-carrier is transmitted in any of the second OFDM symbols of the at least one subframe, and demodulator circuitry configured to detect the signalling data from the OFDM symbols of the preamble signal and to use the signalling data to detect the payload data modulated on the second OFDM symbols of the first of the subframes.

2. The receiver as defined in Clause 1, wherein the predetermined value is a Dx value for a scattered pilot pattern of a sub frame.

3. The receiver as defined in Clause 1, wherein the subframe boundary includes a denser distribution of pilot sub-carriers than another of the second OFDM symbols of the at least one subframe.

4. The receiver as defined in Clause 3, wherein the denser distribution is spaced by a Dx value which is the same as the distribution of pilots of the scattered pilot pattern of the second OFDM symbols of the at least one subframe.

5. The receiver as defined in Clause 1, wherein the at least one subframe boundary OFDM symbol is a subframe start symbol transmitted in time at the beginning of a subframe.

6. The receiver as defined in Clause 1, wherein the at least one subframe boundary OFDM symbol is a subframe closing symbol transmitted in time at the end of a subframe.

7. The receiver as defined in Clause 1, wherein the said subframe is the last subframe in time of a plurality of subframes of the time divided-frame.

8. The receiver as defined in Clause 1, wherein the at least one subframe boundary OFDM symbol is only one subframe boundary OFDM symbol and is the only subframe boundary OFDM symbol of a time-divided frame.

9. The receiver as defined in Clause 1, wherein a subframe includes two subframe boundary symbols transmitted respectively in time at beginning and end of a subframe.

10. The receiver as defined in Clause 1, wherein the subframe boundary symbols comprise pilots and further comprise cells set to zero which balance the average power of the sub-frame boundary symbols.

11. The receiver as defined in Clause 1, being configured to receive a television signal.

12. The receiver as defined in Clause 1, being an ATSC television receiver.

13. The receiver as defined in Clause 1, further comprising a display to which the detected.

14. A method comprising:

detecting a received signal comprising Orthogonal Frequency Division Multiplexed (OFDM) symbols in one or more of a plurality of time divided frames, each frame including a bootstrap signal, a preamble signal and a plurality of subframes each of which carries payload data modulated on a plurality of second OFDM symbols, the preamble signal comprising one or more OFDM symbols modulated with signalling data, and each of the one or more second OFDM symbols of the subframe includes scattered pilot sub-carriers at locations in the second OFDM symbols according to a predetermined pattern, the scattered pilot sub-carriers in each second OFDM symbol being at locations displaced with respect to a sub-carrier in a previous second OFDM symbol by a predetermined value, at least one subframe including at least one subframe boundary OFDM symbol which includes pilot sub-carrier symbols at sub-carrier locations corresponding to any sub-carrier location at which a scattered pilot sub-carrier is transmitted in any of the second OFDM symbols of the at least one subframe, and detecting the signalling data from the OFDM symbols of the preamble signal and using the signalling data to detect the payload data modulated on the second OFDM symbols of the first of the subframes.

15. A non-transitory computer readable medium including computer program instructions, which when executed by a computer causes the computer to perform the method of clause 14.

16. A transmitter for transmitting payload data using Orthogonal Frequency Division Multiplexed (OFDM) symbols, the transmitter comprising:

a frame builder configured to receive the payload data and signalling data and to form the payload data with the signalling data into a plurality of time divided frames for transmission, each of the time divided frames including a bootstrap signal, a preamble signal and a plurality of subframes;

a modulator configured to modulate one or more OFDM symbols of the preamble with the signalling data and to modulate a plurality of second OFDM symbols with the payload data for transmission in each of the subframes wherein the modulator is configured with the frame builder to generate, for each subframe, one or more second OFDM symbols carrying the payload data, and each of the one or more second OFDM symbols of the subframe includes scattered pilot sub-carriers at locations in the second OFDM symbols according to a predetermined pattern, the scattered pilot sub-carriers being transmitted in each second OFDM symbol at locations displaced with respect to a sub-carrier in a previous second OFDM symbol by a predetermined value, at least one subframe including at least one subframe boundary OFDM symbol which includes pilot sub-carrier symbols at sub-carrier locations corresponding to any subcarrier location at which a scattered pilot sub-carrier is transmitted in any of the second OFDM symbols of the at least one subframe, and a transmission circuit for transmitting the OFDM symbols of the preamble carrying the signalling data, and the payload data and subframe boundary symbol in the at least one subframes.

17. A method comprising
receiving payload data and signalling data and forming the payload data with the signalling data into a plurality of time divided frames for transmission, each of the time divided frames including a bootstrap signal, a preamble signal and a plurality of subframes, modulating one or more OFDM symbols of the preamble with the signalling data and to modulate a plurality of second OFDM symbols with the payload data for transmission in each of the subframes wherein the modulator is configured with the frame builder to generate, for each subframe, one or more second OFDM symbols carrying the payload data, and each of the one or more second OFDM symbols of the subframe includes scattered pilot sub-carriers at locations in the second OFDM symbols according to a predetermined pattern, the scattered pilot sub-carriers being transmitted in each second OFDM symbol at locations displaced with respect to a sub-carrier in a previous second OFDM symbol by a predetermined value, at least one subframe including at least one subframe boundary OFDM symbol which includes pilot sub-carrier symbols at sub-carrier locations corresponding to any sub-carrier location at which a scattered pilot sub-carrier is transmitted in any of the second OFDM symbols of the at least one subframe, and transmitting the OFDM symbols of the preamble carrying the signalling data, and the payload data.

Various further aspects and features of the present technique are defined in the appended clauses and various combinations of the features of the dependent clauses may be made with those of the independent clauses other than the specific combinations recited for the clause dependency. Modifications may also be made to the embodiments hereinbefore described without departing from the scope of the present technique. For instance, processing elements of embodiments may be implemented in hardware, software, and logical or analogue circuitry. Furthermore, although a feature may appear to be described in connection with particular embodiments, one skilled in the art would recognise that various features of the described embodiments may be combined in accordance with the present technique.

The invention claimed is:

1. A receiver comprising:
radio frequency demodulation circuitry configured to detect a received signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more first OFDM symbols modulated with signalling data,
wherein a first subframe following the preamble in a frame comprises a subframe boundary symbol only at the end of the first subframe;
wherein subsequent subframes in the frame comprise a first subframe boundary symbol at start of each of the subsequent subframes and a second subframe boundary symbol at the end of each of the subsequent subframes; and demodulator circuitry configured to detect the signalling data from the first OFDM symbols of the preamble signal and to use the signalling data to detect the payload data modulated on the second OFDM symbols of the first of the subframes.

2. The receiver according to claim 1, wherein at least one subframe includes at least one boundary OFDM symbol, which includes pilot sub-carrier at location corresponding to any sub-carrier location at which a scattered pilot carrier is transmitted in any of the second OFDM symbols of the at least one subframe.

3. The receiver according to claim 1, wherein a Fast Fourier transform (FFT) size of the one or more first OFDM symbols of the preamble is the same FFT size as for the plurality of second OFDM symbols modulated with payload data carried by the first subframe.

4. The receiver according to claim 1, wherein a Fast Fourier transform (FFT) size of the one or more first OFDM symbols of the preamble and FFT size of the one or more second OFDM symbols of at least one of subsequent frame is different.

5. The receiver according to claim 1, wherein a Fast Fourier transform (FFT) size of the one or more first OFDM symbols of the preamble and a FFT size of the second OFDM symbols of the first frame is indicated by the bootstrap signal.

6. The receiver according to claim 1, wherein a scattered pilot pattern of the preamble is the same as a scattered pilot pattern of the plurality of second OFDM symbols of the first subframe.

7. A receiving method comprising:
detecting a received signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more first OFDM symbols modulated with signalling data,
wherein a first subframe following the preamble in a frame comprises a subframe boundary symbol only at the end of the first subframe;
wherein subsequent subframes in the frame comprise a first subframe boundary symbol at start of each of the subsequent subframes and a second subframe boundary symbol at the end of each of the subsequent subframes;
detecting the signalling data from the first OFDM symbols of the preamble signal, and
using the signalling data to detect the payload data modulated on the second OFDM symbols of the first of the subframes.

8. The receiving method according to claim 7, wherein at least one subframe includes at least one boundary OFDM symbol, which includes pilot sub-carrier at location corresponding to any sub-carrier location at which a scattered pilot carrier is transmitted in any of the second OFDM symbols of the at least one subframe.

9. The receiving method according to claim 7, wherein a Fast Fourier transform (FFT) size of the one or more first OFDM symbols of the preamble is the same FFT size as for the plurality of second OFDM symbols modulated with payload data carried by the first subframe.

10. The receiving method according to claim 7, wherein a Fast Fourier transform (FFT) size of the one or more first OFDM symbols of the preamble and FFT size of the one or more second OFDM symbols of at least one of subsequent frame is different.

11. The receiving method according to claim 7, wherein a Fast Fourier transform (FFT) size of the one or more first OFDM symbols of the preamble and a FFT size of the second OFDM symbols of the first frame is indicated by the bootstrap signal.

12. The receiving method according to claim 7, wherein a scattered pilot pattern of the preamble is the same as a scattered pilot pattern of the plurality of second OFDM symbols of the first subframe.

13. A non-transitory computer readable medium including computer program instructions, which when executed by a computer causes the computer to perform the method of claim 7.

14. A transmitting method comprising:
- transmitting a signal comprising Orthogonal Frequency Division Multiplexed (OFDM) symbols in one or more of a plurality of time divided frames, each frame including a bootstrap signal, a preamble signal and a plurality of subframes each of which carry payload data modulated on a plurality of second OFDM symbols, the preamble signal comprising one or more first OFDM symbols modulated with signalling data,
- wherein a first subframe following the preamble in a frame comprises a subframe boundary symbol only at the end of the first subframe;
- wherein subsequent subframes in the frame comprise a first subframe boundary symbol at start of each of the subsequent subframes and a second subframe boundary symbol at the end of each of the subsequent subframes.

\* \* \* \* \*